US008248394B2

(12) United States Patent
Toyooka et al.

(10) Patent No.: US 8,248,394 B2
(45) Date of Patent: Aug. 21, 2012

(54) ELECTRO-OPTICAL DEVICE, DRIVING METHOD THEREOF, AND ELECTRONIC APPARATUS

(75) Inventors: Takashi Toyooka, Matsumoto (JP); Kazuhisa Mizusako, Chino (JP)

(73) Assignee: Seiko Epson Corporation, Tokyo (JP)

( * ) Notice: Subject to any disclaimer, the term of this patent is extended or adjusted under 35 U.S.C. 154(b) by 584 days.

(21) Appl. No.: 12/539,316

(22) Filed: Aug. 11, 2009

(65) Prior Publication Data

US 2010/0073341 A1 Mar. 25, 2010

(30) Foreign Application Priority Data

Sep. 19, 2008 (JP) ................................ 2008-240388

(51) Int. Cl.
*G09G 5/00* (2006.01)
*G06F 3/038* (2006.01)

(52) U.S. Cl. ....................................... 345/207; 345/204

(58) Field of Classification Search .................. 345/207, 345/204
See application file for complete search history.

(56) References Cited

U.S. PATENT DOCUMENTS 5,583,528 A * 12/1996 Ebihara ......................... 345/207
5,818,402 A * 10/1998 Park et al. ..................... 345/100
6,046,633 A * 4/2000 Shimizu ........................ 345/207
6,771,245 B2 8/2004 Kanbe et al.
2007/0063957 A1* 3/2007 Awakura et al. ................ 345/98

FOREIGN PATENT DOCUMENTS

JP A-09-138380 5/1997
JP A-2000-112437 4/2000
JP A-2002-189460 7/2002
JP A-2006-106149 4/2006
JP A-2008-107590 5/2008

* cited by examiner

*Primary Examiner* — Kevin M Nguyen
(74) *Attorney, Agent, or Firm* — Oliff & Berridge, PLC

(57) ABSTRACT

An electro-optical device includes a display panel having a switching transistor and a pixel electrode that are disposed in correspondence with an intersection of a scanning line and a data line, an opposing electrode that faces the pixel electrode, and an electro-optical layer that is pinched between the pixel electrode and the opposing electrode, a detection unit that detects a current flowing through the electro-optical layer, and a control unit, wherein, when a voltage of a high electric potential is defined to have the positive-polarity and a voltage of a low electric potential is defined to have the negative polarity with reference to the opposing electrode electric potential applied to the opposing electrode as a reference, a data signal of the positive polarity and a data signal of the negative polarity are alternately supplied to the pixel electrode through the data line.

9 Claims, 27 Drawing Sheets

<VERTICAL SCANNING>

ELECTRO-OPTICAL DEVICE, DRIVING METHOD THEREOF, AND ELECTRONIC APPARATUS

BACKGROUND

1. Technical Field

The present invention relates to an electro-optical device, a driving method thereof and an electronic apparatus having the electro-optical device.

2. Related Art

As an example of an electro-optical device, liquid crystal display devices will be described.

Generally, in liquid crystal display devices of an active matrix type in which a pixel electrode is driven by a thin film transistor (hereinafter, referred to as "TFT"), in order to prevent display problems such as flicker or burn-in of a displayed image, for example, inversion driving (driving by an alternating voltage) where the polarity of a driving voltage applied to each pixel electrode is inverted every frame of an image signal has been employed.

This is for preventing a DC voltage component from being applied to a liquid crystal layer and for resolving display problems such as burn-in by utilizing the inversion driving. However, by simply performing only the inversion driving, the application of a DC voltage component is not completely prevented, and still the display problems occur.

In other words, even when the inversion driving is performed, a DC voltage component is applied to the liquid crystal layer. Accordingly, a countermeasure for the generation sources of this DC voltage component is needed. In addition, as the generation sources of the DC voltage component, the following two phenomena are known of.

First, the first phenomenon is so-called a field-through (also referred to as push-down) phenomenon. The field-through is a phenomenon where the voltage of a pixel electrode connected to the drain terminal of a TFT decreases due to parasitic capacitance between the gate and the drain terminals of the TFT and between the source and drain terminals of the TFT when the TFT is switched from the ON state to the OFF state. In particular, the field-through is a phenomenon of a voltage decrease of the pixel electrode due to the redistribution of electric charges that are stored in the parasitic capacitance and the storage capacitor at the off timing of the TFT.

The second phenomenon is generation of a DC voltage component due to a characteristic difference between a component substrate and an opposing substrate that sandwitches the liquid crystal layer. In particular, this phenomenon is due to asymmetry of electrical characteristics of the component substrate in which a pixel electrode, a TFT, and the like, are formed and the opposing substrate in which a common electrode is formed.

In JP-A-2002-189460, a method of driving a liquid crystal display device has been proposed in consideration of the above-described two phenomena.

In the driving method, it is proposed that a common electrode electric potential which is the reference for the inversion of the polarity in the inversion driving is shifted in advance by a voltage change caused by the field-through and the characteristic difference. In particular, a voltage variation, due to the field-through and the DC voltage component generated by the characteristic difference, is measured on a predetermined measurement condition, and the sum value thereof is added to the set electric potential of the common electrode as a constant correction voltage in the initial setting process.

However, in the typical driving method disclosed in JP-A-2002-189460, there have been difficulties with sufficiently suppressing display problems such as flicker or burn-in of a displayed image. In particular, according to experimental data of the inventors, it is difficult to offset the DC voltage component by a constant correction voltage, because the DC voltage component due to a characteristic difference between a component substrate and an opposing substrate correlates with a driving voltage. In addition, although the correlation ratio is lower than that of the characteristic difference, there is also correlation between the field-through and the driving voltage.

In summary, in a typical liquid crystal display device in which the DC voltage components, due to the above-described two phenomena, are compensated by a constant correction voltage, display problems such as burn-in occur due to the application of the DC voltage component to the liquid crystal layer.

SUMMARY

An advantage of some aspects of the invention is that it provides an electro-optical device, a driving method thereof, and an electronic apparatus having the electro-optical device. The invention can be implemented as the following applied examples or forms.

APPLIED EXAMPLES

According to a first aspect of the invention, there is provided an electro-optical device which includes: a display panel which has a switching transistor and a pixel electrode that are disposed in correspondence with an intersection of a scanning line and a data line, an opposing electrode that faces the pixel electrode, and an electro-optical layer that is disposed between the pixel electrode and the opposing electrode; a detection unit that detects a current flowing through the electro-optical layer; and a control unit that controls the display driving of the display panel, wherein, when a voltage of an electric potential higher than an opposing electrode electric potential applied to the opposing electrode is defined to have a positive polarity and a voltage of an electric potential lower than the opposing electrode electric potential is defined to have a negative polarity, a data signal of the positive polarity and a data signal of the negative polarity are alternately supplied to the pixel electrode through the data line, and the control unit measures, based on a detection data supplied by the detection unit, a first accumulation current accumulated during a period in which a voltage of the positive polarity is applied and a second accumulation current accumulated during a period in which a voltage of the negative polarity is applied, and adjusts the opposing electrode electric potential such that a difference between the absolute value of the first accumulation current and the absolute value of the second accumulation current is decreased.

As described above, in a typical electro-optical device in which a correction process is performed by using a constant correction voltage value, for example, set in the initial setting process such as the final adjustment in a shipment stage, it is difficult to offset a DC voltage component that has correlation with a driving voltage.

In other words, as the correction voltage is correlated with the driving voltage which has a value which changes in accordance with a display scale level, it is preferable that the correction voltage is adjusted in real time in accordance with a change in the driving voltage.

The inventors have invented an electro-optical device of the applied example in consideration of this point after having performed creative research. According to the electro-optical device of the applied example, the control unit adjusts the opposing electrode electric potential such that a difference between the absolute value of the first accumulation current and the absolute value of the second accumulation current is decreased based on the detection data supplied by the detection unit. In other words, detection of the current is performed in real time in parallel with inversion driving, and the result is reflected on the settings of the opposing electrode potential. Accordingly, the correction voltage can be adjusted in real time in accordance with the change of the driving voltage. Therefore, a DC voltage component that has correlation with the driving voltage can be offset.

As a result, an electro-optical device capable of suppressing display problems such as burn-in more than a typical electro-optical device can be provided.

According to a second aspect of the invention, there is provided an electro-optical device including: a display panel which has a switching transistor and a pixel electrode that are disposed in correspondence with an intersection of a scanning line and a data line, an opposing electrode that faces the pixel electrode, and an electro-optical layer that is disposed between the pixel electrode and the opposing electrode; a detection unit that detects a current flowing through the electro-optical layer; and a control unit that controls the display driving of the display panel, wherein, when a voltage of an electric potential higher than an opposing electrode electric potential applied to the opposing electrode is defined to have a positive polarity and a voltage of an electric potential lower than the opposing electrode electric potential is defined to have a negative polarity, a data signal of the positive polarity and a data signal of the negative polarity are alternately supplied to the pixel electrode through the data line, and the control unit measures, based on a detection data supplied by the detection unit, a first accumulation current accumulated during a period in which a voltage of the positive polarity is applied and a second accumulation current accumulated during a period in which a voltage of the negative polarity is applied, and adjusts the opposing electrode electric potential such that a sum current acquired from adding the absolute value of the first accumulation current and the absolute value of the second accumulation current is smaller than a predetermined current value.

According to a third aspect of the invention, there is provided an electro-optical device including: a display panel having a switching transistor and a pixel electrode that are disposed in correspondence with an intersection of a scanning line and a data line, an opposing electrode that faces the pixel electrode, and an electro-optical layer that is disposed between the pixel electrode and the opposing electrode; a detection unit that detects a current flowing through the electro-optical layer; and a control unit that controls the display driving of the display panel, wherein, when a voltage of an electric potential higher than an opposing electrode electric potential applied to the opposing electrode is defined to have a positive polarity and a voltage of an electric potential lower than the opposing electrode electric potential is defined to have a negative polarity, a data signal of the positive polarity and a data signal of the negative polarity are alternately supplied to the pixel electrode through the data line, and the control unit measures, based on a detection data supplied by the detection unit, a first accumulation current accumulated during a period in which a voltage of the positive polarity is applied and a second accumulation current accumulated during a period in which a voltage of the negative polarity is applied, and adjusts a ratio of a period length of a period where the voltage of the positive polarity is applied to a period length of a period where the voltage of the negative polarity in one cycle of the data signal such that a difference between the absolute value of the first accumulation current and the absolute value of the second accumulation current is decreased.

In the above-described electro-optical device, it is preferable that the detection unit has a resistor, as a current detecting element, that is inserted into the first wiring used for supplying the opposing electrode electric potential from the control unit to the opposing electrode so that the detection unit can detect the current flowing in the electro-optical layer through the opposing electrode based on an electric potential difference that is generated between both ends of the resistor.

In addition, it is preferable that the above-described electro-optical device further includes: a second wiring that is used for supplying the opposing electrode electric potential that does not pass through the detection unit to the opposing electrode from the control unit; and a shift switch that is used for shifting between the first wiring and the second wiring. In such a case, the control unit selects the first wiring by using the shift switch when the opposing electrode electric potential is being adjusted and selects the second wiring by using the shift switch when ordinary display is being performed.

In addition, in the above-described electro-optical device, it is preferable that the opposing electrode is configured by a first opposing electrode that is disposed in an area overlapping the display area of the display panel in the plan view and a second opposing electrode that is disposed in an area located in the outside of the display area and is electrically independent from the first opposing electrode, with the opposing electrode electric potential supplied both to the first opposing electrode and to the second opposing electrode from the control unit, the detection unit can detect the current flowing in the electro-optical layer through the second opposing electrode.

In addition, in the above-described electro-optical device, it is preferable that the detection unit has a magnetic sensor as a current detecting element that is disposed along a wiring used for supplying the opposing electrode electric potential to the opposing electrode, and the detection unit detects the current based on an output of the magnetic sensor.

In addition, in the above-described electro-optical device, it is preferable that the detection unit has an optical sensor that is used for detecting display luminance of the display panel, the control unit measures the first response time that is required to obtain a predetermined luminance of the display luminance by sequentially detecting the display luminance using the optical sensor during a period in which a voltage of the positive polarity is applied, the control unit measures a second response time that is required to obtain a predetermined luminance of the display luminance by sequentially detecting the display luminance using the optical sensor during a period in which a voltage of the negative polarity is applied, and the control unit then adjusts the opposing electrode electric potential such that a difference between the first response time and the second response time is decreased based on the correlation between the first response time and the first accumulation current and the correlation between the second response time and the second accumulation current.

According to a fourth aspect of the invention, there is provided an electronic apparatus including the above-described electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
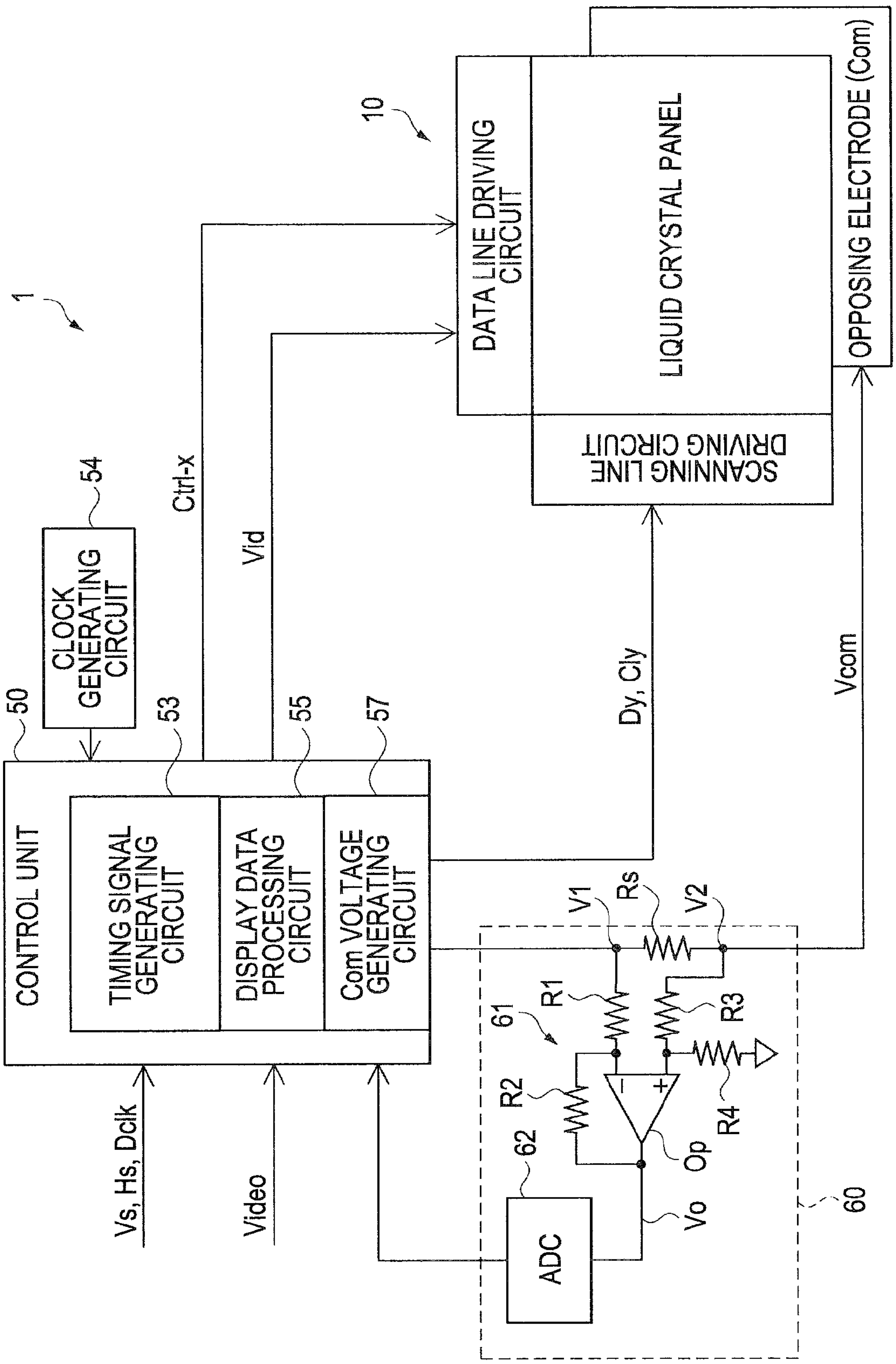
FIG. 1 is a diagram showing a schematic configuration of an electro-optical device according to Embodiment 1 of the invention.

Hereinafter, embodiments of the invention will be described with reference to the accompanying drawings. In the drawings described below, in order to resize each layer or for each member to be recognizable in the drawings, the scales of layers and members may be set differently.

Embodiment 1

<<Schematic Configuration of Electro-Optical Device>>

FIG. 1 is a diagram showing a schematic configuration of an electro-optical device according to an embodiment of the invention.

First, the basic configuration of the electro-optical device 1 according to Embodiment 1 of the invention will be described with reference to FIG. 1.

The electro-optical device 1 is configured by a display panel 10, a control unit 50, a detection unit 60, and the like. The display panel 10 is a transmissive liquid crystal panel of an active matrix type. In addition, the detailed configuration thereof will be described later.

The control unit 50 is configured to include a timing signal generating circuit 53, a display data processing circuit 55, and a Com voltage generating circuit 57. The control unit 50 controls the display driving of the display panel 10.

In addition, a memory section (not shown) that is formed of a non-volatile memory, such as a flash memory, is disposed in the control unit 50. In the memory section, there are stored various programs and accompanying data, which are used for controlling the operation of the electro-optical device 1, including a plurality of adjustment programs that define the sequence and the content of operations for adjusting the electric potential of an opposing electrode electric potential Vcom based on the detection data supplied by the detection unit 60.

In addition, the control unit 50 may be configured, for example, by a one-chip image processor including a CPU (Central Processing Unit) and a memory. The control unit 50 and the display panel 10 are connected to each other, for example, through an FPC (Flexible Printed Circuit).

To the timing signal generating circuit 53, a clock generating circuit 54 is attached.

The clock generating circuit 54 has an oscillation element such as a crystal oscillation built therein. The clock generating circuit 54 generates a clock signal that becomes a reference for the control operations of each unit and outputs the clock signal to the timing signal generating circuit 53.

The timing signal generating circuit 53 generates various control signals that are used for controlling the display panel 10 in synchronization with a vertical synchronization signal Vs, a horizontal synchronization signal Hs, and a dot clock signal Dclk that are supplied from an external higher-level apparatus (not shown).

The display data processing circuit 55 is configured to include a DA converter not shown in the figure. The display data processing circuit 55 processes display data Video that is supplied from the external higher-level apparatus into a form appropriate for display in the display panel 10 and outputs the display data Video as an analog data signal Vid (driving voltage) synchronized with driving of the display panel. In addition, the display data Video defines the gray scales of pixels of the display panel 10. One frame of the display data Video is supplied in accordance with the supply timing of the vertical synchronization signal Vs, and one row of the display data Video is supplied in accordance with the supply timing of the horizontal synchronization signal Hs.

The Com voltage generating circuit 57 is configured to include a DC/DC converter and the like. The Com voltage generating circuit 57 generates a plurality of DC voltages that is used for each unit and the opposing electrode electric potential Vcom that is applied to the opposing electrode Com of the display panel 10 from DC power that is supplied from the external higher-level apparatus.

The detection unit 60 is configured to include a resistor Rs as a current detecting element, an amplifier 61, and an AD converter 62. The detection unit 60 detects an electric current flowing in an electro-optical layer through the opposing electrode Com and supply the encoded detection data to the control unit 50.

The resistor Rs is inserted in a wiring 108 that connects the Com voltage generating circuit 57 to the opposing electrode Com. Between both ends of the resistor Rs, a voltage that is in proportion to a current flowing through the wiring is generated. In addition, the resistance value of the resistor Rs is appropriately set based on the magnitude of the driving voltage and the current level required to be detected. For example, when the driving voltage is about 5 V and the detection current is several nA, the level of resistor Rs is set to about several KΩ to several tens of KΩ. The resistor Rs, for example, is built in to the FPC that connects the control unit 50 and the display panel 10.

The amplifier 61 is a differential amplifier that is configured by an operational amplifier Op, resistors $R_1$ to $R_4$, and the like. In particular, the resistor $R_1$ is connected to the negative-side input terminal of the operational amplifier Op and one end of the resistor Rs. The resistor $R_3$ is connected to the positive-side input terminal of the operational amplifier Op and the other end of the resistor Rs. In addition, the resistor $R_2$ is connected to the output terminal of the operational amplifier Op and the negative-side input terminal of the operational amplifier Op. The resistor $R_4$ is connected to the positive-side input terminal of the operational amplifier Op and the ground level. In addition, the resistors $R_1$ and $R_3$ and the resistors $R_2$ and $R_4$ have respectively the same resistance values.

Here, the following Equation (1) is satisfied when the voltage of the input side of the resistor $R_1$ is denoted by $V_1$, the voltage of the input side of the resistor $R_3$ is denoted by $V_2$, and the output voltage Vo of the output terminal of the operational amplifier Op is denoted by Vo.

$$Vo=(R_2/R_1)(V_2-V_1) \quad \text{Equation (1)}$$

In addition, the resistance values of the resistors $R_1$ to $R_4$ are appropriately set in consideration of the value of the resistor Rs, the characteristics of the AD converter 62, and the like. Here, the amplifier 61 is not limited to the differential amplifier and may be an amplifier that can amplify the voltage generated between both ends of the resistor Rs to a level needed for detection of the voltage.

The AD converter 62 converts an analog voltage that is input from the amplifier 61 into a digital signal and transmits the digital signal to the control unit 50. The resolving power of the AD converter 62 is also appropriately set based on the magnitude of the driving voltage and the current level required to be detected. In the above-described example, a resolving power of about 10 bits is preferable.

In addition, the vertical synchronization signal Vs, according to this embodiment, is set to have the frequency of 60 Hz (period of 16.7 milliseconds) for the convenience of description. However, the frequency of the vertical synchronization signal Vs is not limited thereto. In addition, the dot clock signal Dclk defines a period in which the display data Video for one pixel is supplied.

To be described later in detail, the control unit 50 controls each unit in synchronization with supply of the display data Video.

<<Configuration of Display Panel>>

Figure 2:
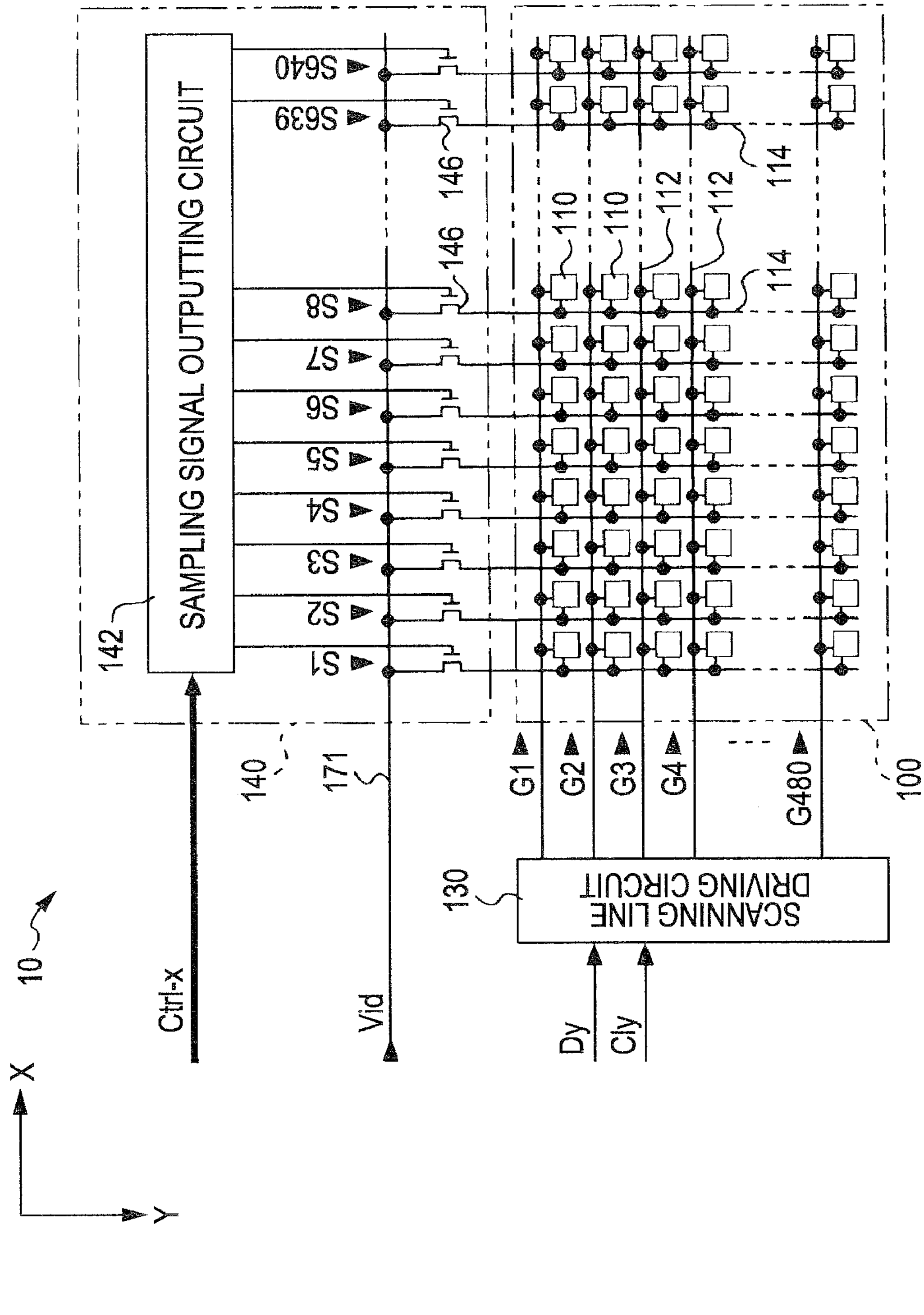
FIG. 2 is a diagram showing the configuration of a display panel.
Figure 3:
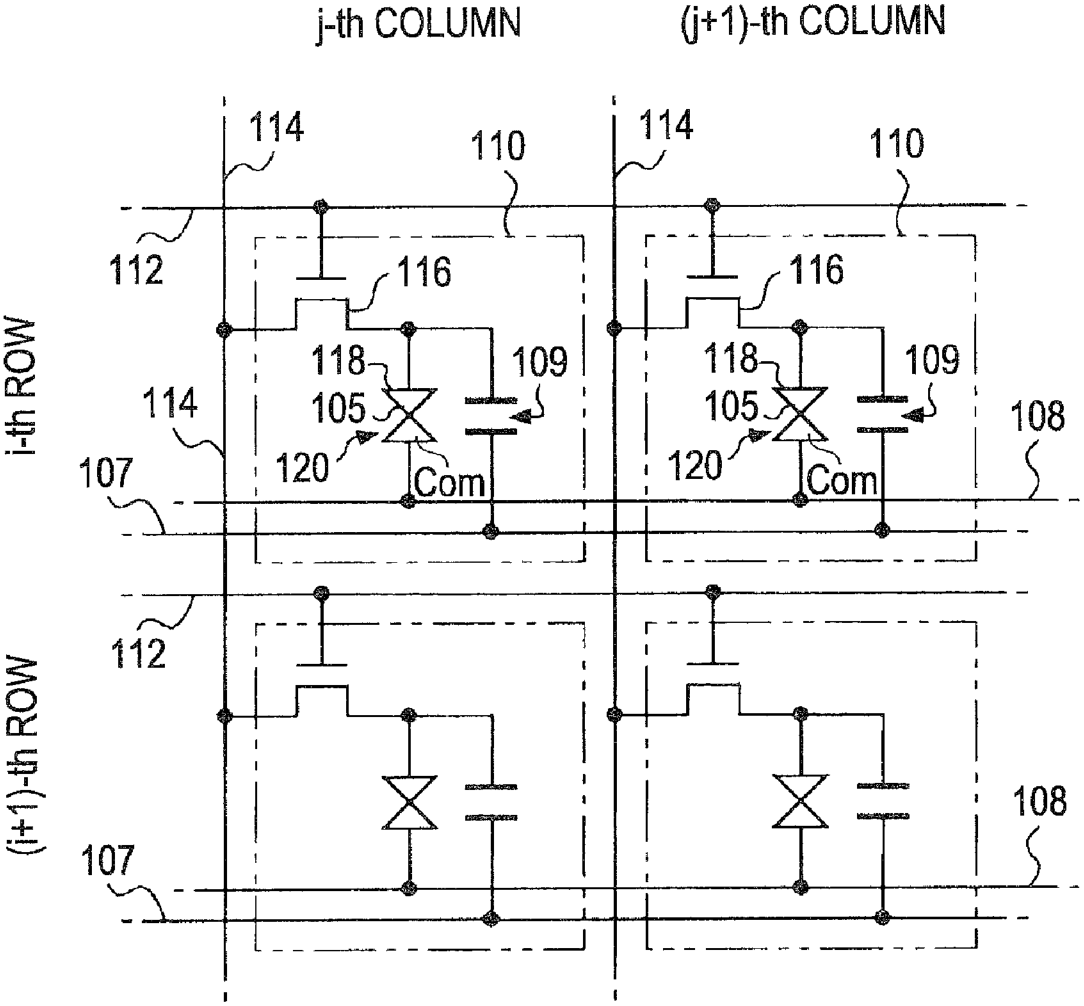
FIG. 3 is a diagram of an equivalent circuit of pixels.

FIG. 2 is a diagram showing the configuration of the display panel 10. FIG. 3 is a diagram of an equivalent circuit of pixels. Next, the configuration of the display panel 10 will be described.

As shown in FIG. 2, the display panel 10 has a configuration in which a scanning line driving circuit 130 and a data line driving circuit 140 are built on the periphery of the display area 100.

In the display area 100, scanning lines 112 of 480 rows are disposed so as to extend in the row direction (X), and data lines 114 of 640 rows are disposed to extend in the column direction (Y) and to maintain electrical insulation from the scanning lines 112.

In addition, a plurality of pixels 110 is formed in correspondence with intersections of the scanning lines 112 of 480 rows and the data lines 114 of 640 columns. In other words, the plurality of pixels 110 is arranged in the shape of a matrix of 480 vertical rows×640 horizontal columns.

In addition, according to this embodiment, for the convenience of description, the resolution is set to VGA (Video Graphics Array). However, the resolution is not limited thereto. Thus, for example, the resolution may be set to XGA (extended Graphics Array), SXGA (Super-XGA), or the like.

FIG. 3 shows the configuration of a total of four pixels of 2×2 corresponding to the intersections of the i-th row and the (i+1)-th row, which are adjacently located to be positioned one row below the (i+1)-th row, and the j-th column and (j+1)-th column that is located adjacent thereto on the right side. Here, i and (i+1) represent rows in which the pixels 110 are arranged and are integers that are equal to or larger than “1” and are equal to or smaller than “480”. In addition, j and (j+1) represent columns in which the pixels 110 are arranged and are integers that are equal to or larger than “1” and are equal to or smaller than “640”.

Each of the plurality of the pixels 110 is configured to include an n-channel type TFT 116 and a liquid crystal capacitor 120.

Here, the pixels 110 have the same configuration, and thus, the pixels 110 that are positioned in the i-th row and the j-th column will be described representatively.

In terms of the pixel 110 positioned in the i-th row and the j-th column, the gate electrode of the TFT 116 is connected to the scanning line 112 of the i-th row. In addition, the source electrode of the TFT 116 is connected to the data line 114 of the j-th column, and the drain electrode of the TFT 116 is connected to a pixel electrode 118 that is disposed at one end of the liquid crystal capacitor 120.

In addition, the other end of the liquid crystal capacitor 120 is connected to the opposing electrode Com. This opposing electrode Com is common to all the pixels 110. In addition, a constant voltage is applied to the opposing electrode Com regardless of the elapsing of time.

In the display panel 10, one pair of substrates, including a component substrate and an opposing substrate, are bonded together with a constant gap maintained therebetween. In addition, the display panel 10 is configured such that liquid crystal is sealed in the gap (for example, FIGS. 11A and 11B). On the component substrate between these substrates, the scanning lines 112, the data lines 114, the TFTs 116, and the pixel electrodes 118 are formed together with the scanning line driving circuit 130 and the data line driving circuit 140, and the opposing electrode Com is formed on the opposing substrate. In addition, the component substrate and the opposing substrate are bonded together with a constant gap maintained therebetween such that electrode forming faces thereof face each other.

Accordingly, a liquid crystal 105 is disposed between the pixel electrode 118 and the opposing electrode Com, whereby the liquid crystal capacitor 120 is configured.

In this embodiment, it is assumed that a normally-white mode, in which the transmittance of light passing through the liquid crystal capacitor becomes the maximum so as to represent white display for a case where the effective value of the voltage maintained in the liquid crystal capacitor 120 is near zero, and the amount of transmitted light decreases so as to finally represent black display having the minimum transmittance as the effective value of the voltage increases, is set.

Under such a configuration, when the TFT 116 is turned on by applying a selection voltage to the scanning line 112 and a data signal of a voltage corresponding to the gray scale (brightness) is supplied to the pixel electrode 118 through the data line 114 and the turned-on TFT 116, an effective value of the voltage corresponding to the gray scale can be maintained in the liquid crystal capacitor 120, which corresponds to the intersection of the scanning line 112 to which the selection voltage is applied and the data line 114 to which the data signal is supplied.

In addition, when the scanning line 112 is in the non-selection state, the TFT 116 is in the OFF (non-conductive) state. However, the off resistance at that moment is not ideally infinite, and accordingly, many electric charges that are accumulated in the liquid crystal capacitor 120 leak. In order to decrease the influence of the off leak, an accumulation capacitor 109 is formed for each pixel. One end of the accumulation capacitor 109 is connected to the pixel electrode 118 (the drain of the TFT 116), and the other end of the accumulation capacitor 109 is commonly connected to the capacitor line 107 over all the pixels 107. This capacitor line 107 maintains a constant electric potential all the time, for example, the opposing electrode electric potential Vcom that is the same as the electric potential of the opposing electrode Com.

The description will be followed with reference to FIG. 2 again.

The scanning line driving circuit 130 supplies scanning signals G1, G2, G3, . . . , G480 to the scanning lines 112 of the 1st, 2nd, 3rd, . . . , 480th rows. The scanning line driving circuit 130 sets the scanning signal for the selected scanning line to level H which corresponds to the selection voltage and sets the scanning signals for other scanning lines to level L corresponding to the non-selection voltage.

The data line driving circuit 140 is configured by a sampling signal outputting circuit 142 and n-channel type TFTs 146 that are disposed in correspondence with the data lines 114. The data line driving circuit 140 supplies data signals Vid that define the gray scales of pixels to the pixels of the selected scanning line.

<<Method of Driving Display>>

Figure 4:
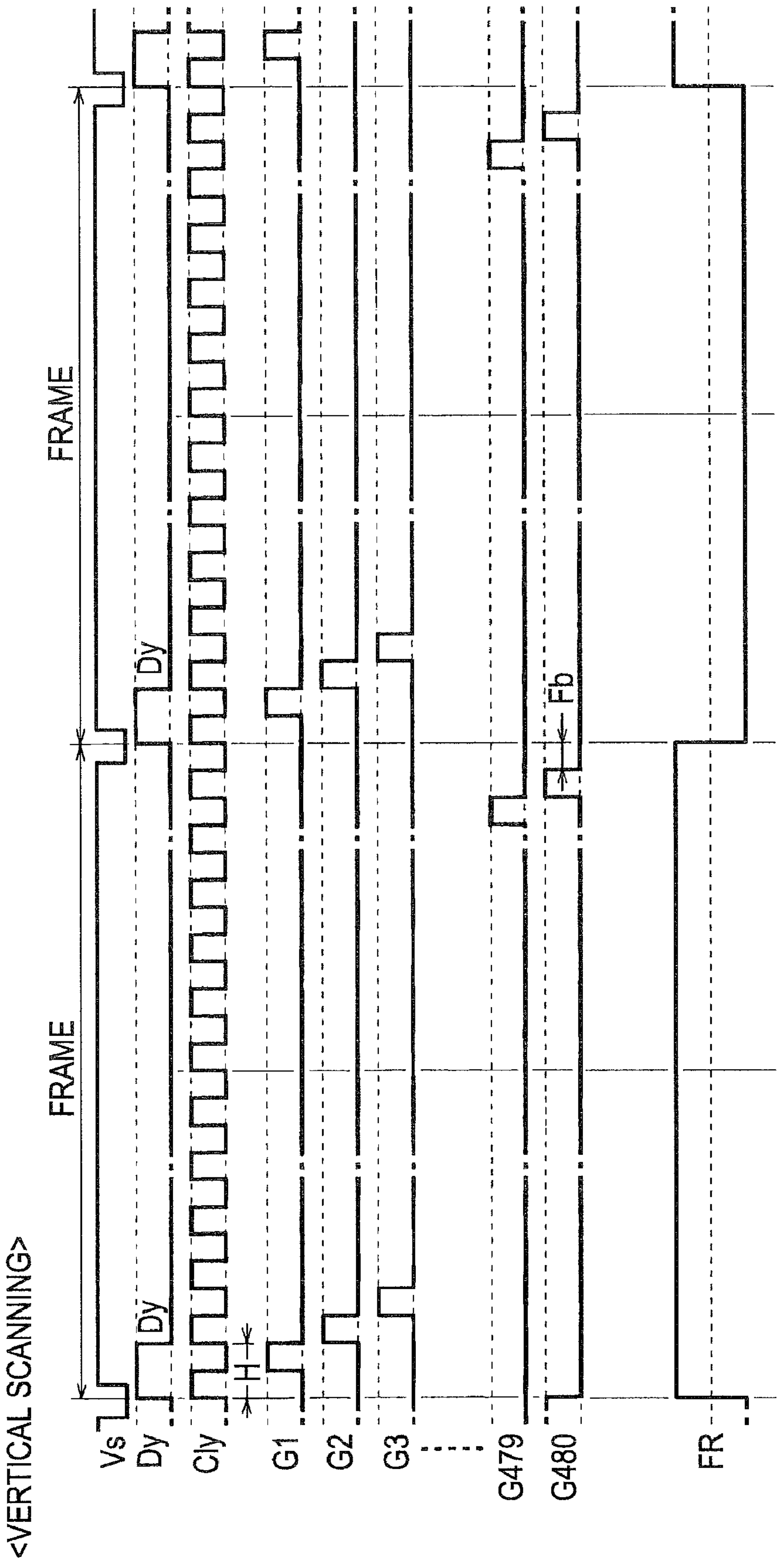
FIG. 4 is a timing chart of the driving method according to Embodiment 1.

FIG. 4 is a timing chart of the driving method according to Embodiment 1.

Here, the basic method of a driving display in an electro-optical device according to this embodiment will be described with reference to FIG. 4.

In Embodiment 1, a frame-inversion driving method is used in which the polarity of the data signal Vid is inverted for every vertical synchronization signal Vs.

FIG. 4 is a timing chart showing the relationship of scanning signals G1 to G480 that are output by the scanning line driving circuit 130 and a vertical synchronization signal Vs, a start pulse Dy, a clock signal Cly, and an alternating signal FR.

In FIG. 4, a frame represents a period that is needed for displaying one image in the display panel 10. In addition, one scanning line is selected once during the period of one frame. The vertical synchronization signal Vs, according to this embodiment, has the frequency of 60 Hz as described above. Accordingly, the period of one frame is fixed to 16.7 milliseconds. The control unit 50 (FIG. 1) outputs the clock signal Cly, which has the duty ratio of 50%, in 480 periods which is the same as the number of the scanning lines over one frame period. Here, a period corresponding to one period of the clock signal Cly is denoted by H.

In addition, the control unit 50 outputs a start pulse Dy, which has a pulse width corresponding to one period of the clock signal Cly, each time when the vertical synchronization signal Vs is input.

In particular, when the vertical synchronization signal Vs falls, the control unit 50 outputs the start pulse Dy in synchronization with rise of the clock signal Cly to level H.

In addition, the control unit 50 generates an alternating signal FR of which the positive or negative polarity is inverted in synchronization with rise of the start pulse Dy and outputs a data signal Vid that is adjusted to the polarity of the alternating signal. In particular, the alternating signal FR has the positive polarity in the first frame and has the negative polarity in the second frame. Thereafter, the alternating signal FR has the positive polarity in an odd frame and has the negative polarity in an even frame.

The scanning line driving circuit 130 outputs scanning signals G1 to G480 described below based on the start pulse Dy and the clock signal Cly.

First, the scanning signal G1, that is supplied to the scanning line located in the uppermost position, is output at a timing delayed by a half period from the time when the clock signal Cly rises for the first time after the start pulse Dy is supplied. Then, following the scanning signal G1, the scanning signals G2 to G480 sequentially have the level H during a period of a half period of the clock signal each time the logical level of the clock signal Cly is changed. Accordingly, as shown in FIG. 4, the scanning lines of the 1st to 480th rows are selected one after another in the prescribed order in accordance with supply of the start pulse Dy in each frame.

In addition, the period after the scanning signal G480 is output and before the start pulse Dy of the next frame is output represents a flyback time Fb of the scanning line.

<<Method of Adjusting Vcom>>

Figure 5:
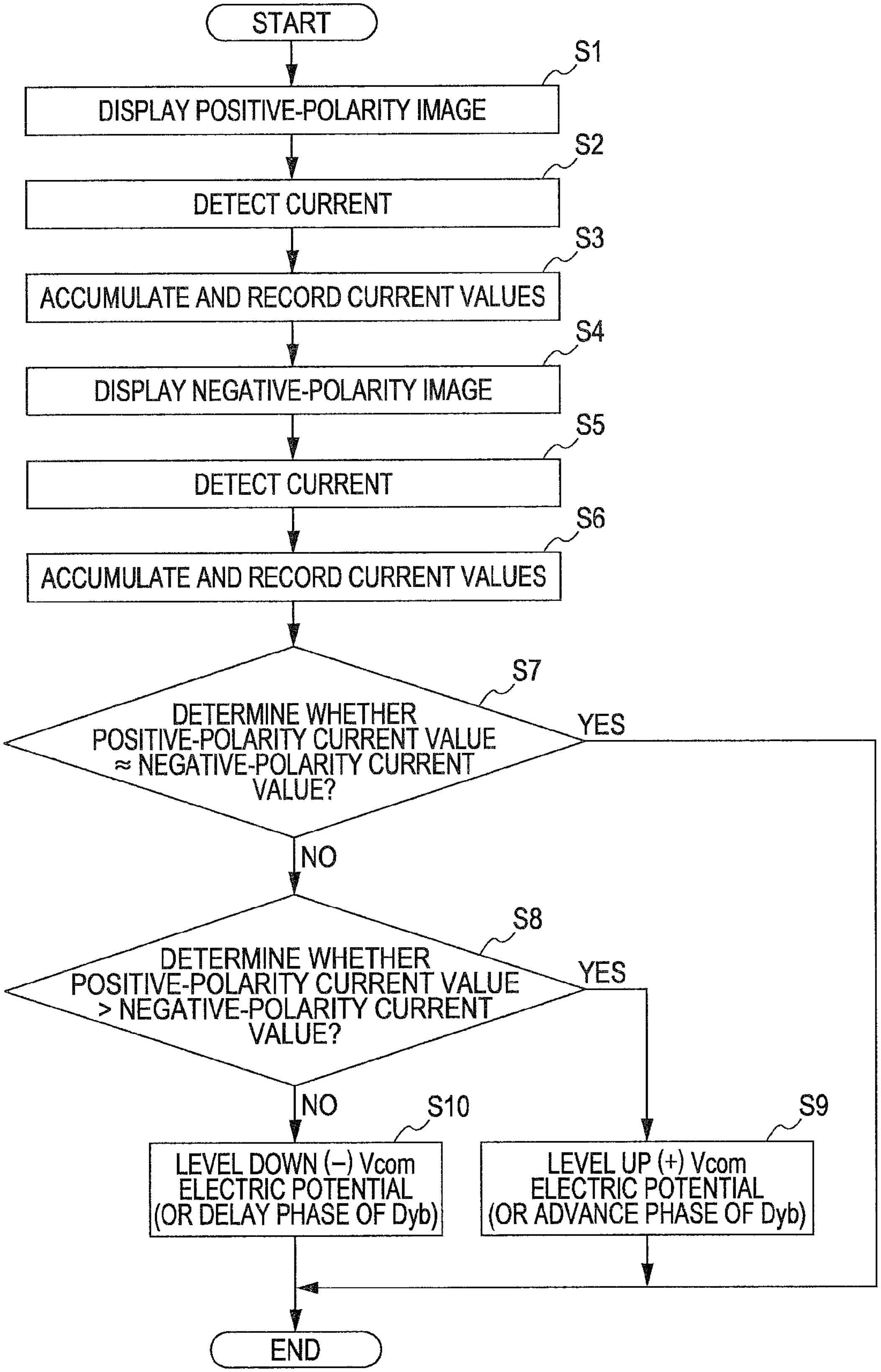
FIG. 5 is a flowchart showing a method of adjusting an opposing electrode electric potential according to Embodiment 1.
Figure 6:
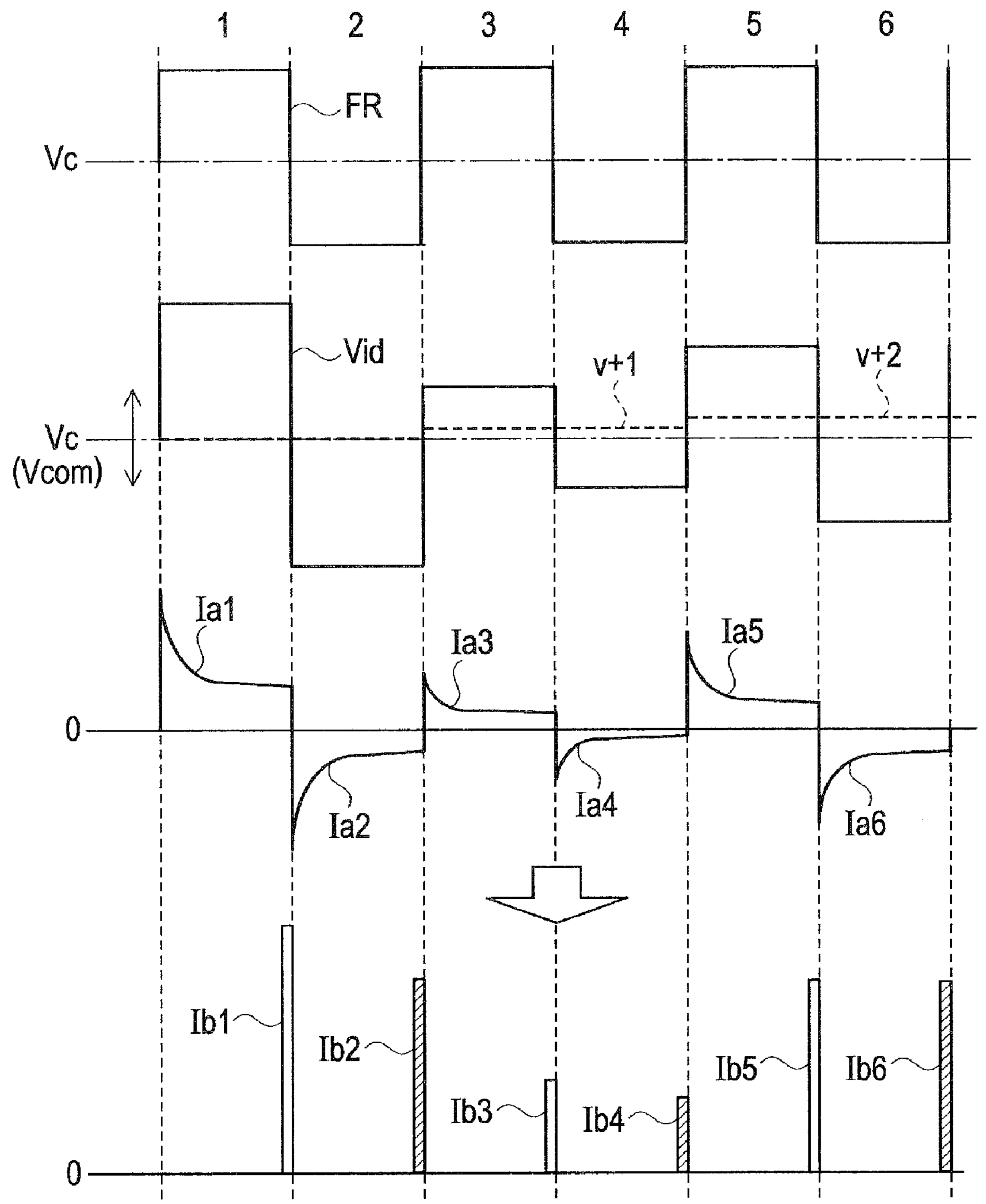
FIG. 6 is a timing chart showing one form of a detection current according to the adjustment method.

FIG. 5 is a flowchart showing a method of adjusting the opposing electrode electric potential according to this embodiment. FIG. 6 is a timing chart showing one form of the detection current according to this adjustment method. Hereinafter, the method of adjusting the opposing electrode electric potential Vcom according to this embodiment will be described focusing on FIG. 5 and FIG. 6.

In addition, according to the adjustment method of this embodiment, the opposing electrode electric potential Vcom is adjusted in the frame-inversion driving process such that a current flowing in a positive-polarity image displaying period and a current flowing in a negative-polarity image displaying period are the same.

In addition, steps to be described below with reference to FIG. 5 are performed by the units of the electro-optical device 1 based on the opposing electrode electric potential Vcom adjusting program that is stored in the memory section of the control unit 50. The frame numbers described below do not represent a specific frame but represents a frame that is part of a continuous time series.

First, this adjustment method is configured to be automatically performed after an initial operation when the electro-optical device 1 is started to be driven. In other words, this adjustment method is performed in parallel with the operation of driving of display that is performed by the electro-optical device 1.

In Step S1, a positive-polarity image is displayed in the first frame.

In Step S2, a current flowing into the opposing electrode Com during the positive-polarity image displaying period, that is, a current flowing through the wiring 108, is detected by the detection unit 60.

In Step S3, in the control unit 50, the current that flows during the positive-polarity image displaying period is accumulated and recorded.

In Step S4, a negative-polarity image is displayed in the following second frame.

In Step S5, a current flowing in the wiring 108 during the negative-polarity image displaying period is detected by the detection unit 60.

In Step S6, a current that flows in the control unit 50 during the positive-polarity image displaying period is accumulated and recorded.

FIG. 6 shows one form of the above-described Steps S1 to S6. Here, numbers attached to the uppermost portions of the figure represent the frame numbers.

First, in the first frame, a data signal Vid that is in synchronization with the timing and the polarity of the alternating signal FR is output from the display data processing circuit 55. In other words, the data signal Vid of the positive polarity is output (Step S1).

In FIG. 6, a temporal change of a detection current Ia1, that is detected by the detection unit 60 when the data signal Vid having the positive polarity is applied, is shown. As shown in the graph, when the data signal Vid rises, the maximum current flows. Thereafter, the current slowly decreases (Step S2). In addition, it has been estimated that a large current at the time of inversion of polarity in particular influences burn-in. Accordingly, as shown in FIG. 6, it is important to reliably detect this portion of the current.

The control unit 50 accumulates the detection current Ia1 and records the accumulated detection current in the internal memory section as an accumulated current value. A graph that is located in the lowermost portion of FIG. 6 represents the accumulated accumulation current Ib1 (Step S3). In this graph, the accumulated current value is represented as the height of the accumulation current Ib1.

In addition, although both the vertical axis of the graph of the detection current Ia1 and the vertical axis of the graph of the accumulation current Ib1 represent values of currents, the scales thereof are set different from each other.

Subsequently, also in the second frame, same as in the first frame, a data signal Vid, which has a negative polarity that is in synchronization with the timing and the polarity of the alternating signal FR, is output (Step S4). In addition, in the frame-inversion driving process, in two consecutive frames, voltages of the same absolute value that have the positive and negative polarities with reference to a reference voltage Vc are applied alternately.

In the figure, a temporal change of a detection current Ia2, that is detected by the detection unit 60 when the data signal Vid having the negative polarity is applied, is shown. The polarity of the detection current Ia2 is opposite to the polarity of the detection current Ia1 of the first frame. As shown in the graph, the detection current Ia2 has its maximum value at a time when the data signal Vid rises, and thereafter, the detection current Ia2 decreases slowly (Step S5).

The control unit 50 accumulates the detection current Ia2 and records the value of the accumulated detection current in the internal memory section. The accumulated current is denoted by an accumulation current Ib2 in the lowermost graph of FIG. 6 (Step S6).

As described above, the detection currents Ia1 and Ia2 have polarities. However, according to this adjustment method, only the absolute values of the accumulation current during a period when the positive-polarity voltage was applied (the positive-polarity image displaying period) and the accumulation current during a period when the negative-polarity voltage was applied (the negative-polarity image displaying period) are needed to be acquired regardless of the polarities.

Accordingly, in the lowermost graph of FIG. 6, the detection current Ia2 which has the negative polarity is represented on the positive-polarity side.

Description will be followed with reference to FIG. 5 again.

In Step S7, it is determined whether the accumulation current accumulated during the positive-polarity image displaying period and the accumulation current accumulated during the negative-polarity displaying period are the same. When both the accumulation currents are the same, this flow is completed. Otherwise, the process proceeds to Step S8.

The determination that the accumulation currents are the same is not limited to the case where the absolute values are the same. Thus, there may be a range of values in which both can be determined to be substantially the same.

In Step S8, it is determined whether the accumulation current accumulated during the positive-polarity image displaying period is larger than the accumulation current accumulated during the negative-polarity image displaying period. When the accumulation current accumulated during the positive-polarity image displaying period is larger than that accumulated during the negative-polarity image displaying period, the process proceeds to Step S9. On the other hand, when the accumulation current accumulated during the positive-polarity image displaying period is smaller than that accumulated during the negative-polarity image displaying period, the process proceeds to Step S10.

In Step S9, the electric potential of the opposing electrode electric potential Vcom is raised by one level, and this flow ends. In Step S10, the electric potential of the opposing electrode electric potential Vcom is lowered by one level, and this flow ends. When the driving voltage is about 5 V, the electric potential of the opposing electrode electric potential Vcom, that is generated by the Com voltage generating circuit 57, is configured to be able to be set stepwise to, for example, a predetermined voltage within the range of several mV to several hundred mV.

Description will be followed with reference to FIG. 6 again.

In the form shown in FIG. 6, the accumulation current Ib1 of the first frame in which the positive-polarity voltage is applied and the accumulation current Ib2 of the second frame in which the negative-polarity voltage is applied are not the same as shown in the figure, and the accumulation current Ib1 is larger than the accumulation current Ib2 (Steps S7 and S8).

Accordingly, the electric potential of the opposing electrode electric potential Vcom is raised by one level, and the process proceeds to the following third frame (Step S9).

Here, the display data processing circuit 55 generates the data signal Vid with the reference voltage Vc used as a reference. This electric potential Vc, for example, is set to 0 V or ground level. In addition, the electric potentials of the opposing electrode electric potentials Vcom of the first and second frames are set to be the same as the reference electric potential Vc.

In other words, by raising the electric potential of the opposing electrode electric potential Vcom by one level, the opposing electrode electric potentials Vcom in the third and fourth frames are the electric potential v+1 that is denoted by the dotted line.

The voltage applied to the liquid crystal in the third and the fourth frames is defined by using the electric potential v+1 as the reference. Accordingly, compared to the case where the reference voltage Vc is used as the reference, the voltage of the positive polarity decreases, and the voltage of the negative polarity increases.

In other words, by shifting the center of the amplitude such that the voltage of the positive polarity is smaller than that of the negative polarity, the accumulation currents of the positive polarity and the negative polarity are controlled so as to be close to one another.

In description here, the opposing electrode electric potential Vcom is used as the reference. When a voltage of an electric potential higher than the opposing electrode electric potential Vcom is defined to have a positive polarity and a voltage of an electric potential lower than the opposing electrode electric potential is defined to have a negative polarity.

Also in the third frame and the fourth frames, the process shown in the flowchart of FIG. 5 is performed. As a result, an accumulation current Ib3 accumulated during the positive-polarity image displaying period and an accumulation current Ib4 accumulated during the period in which the negative-polarity voltage is applied are derived (Steps S1 to S6).

The accumulation current Ib3 in the third frame in which the positive-polarity voltage is applied and the accumulation current Ib4 in the fourth frame in which the negative-polarity voltage is applied are not the same, as shown in FIG. 6, and the accumulation current Ib3 is larger than the accumulation current Ib4 (Steps S7 and S8). Accordingly, the electric potential of the opposing electrode electric potential Vcom is further raised by one level, and then, the process proceeds to the following fifth frame (Step S9).

Accordingly, in the fifth and the sixth frames, the voltage applied to the liquid crystal is applied by referring to the electric potential v+2 as the reference. Thus, compared to the case where the electric potential v+1 is used as the reference, the voltage of the positive polarity further decreases, and the voltage of the negative polarity further increases.

Also in the fifth frame and the sixth frames, the process shown in the flowchart of FIG. 5 is performed. As a result, an accumulation current Ib5 accumulated during the positive-polarity image displaying period and an accumulation current Ib6 accumulated during the period in which the negative-polarity voltage is applied are derived (Steps S1 to S6).

The accumulation current Ib5 in the fifth frame in which the positive-polarity voltage is applied and the accumulation current Ib6 in the sixth frame in which the negative-polarity voltage is applied are the same, as shown in FIG. 6. Accordingly, the process proceeds to the next frame with the electric potential v+2 maintained (Step S7). In the above-described form, Step S10 is not performed. However, in Step S8, if the accumulation current accumulated during the positive-polarity image displaying period is smaller than the accumulation current accumulated during the negative-polarity image displaying period, the process of lowering the electric potential of the opposing electrode electric potential Vcom by one level should be performed. Accordingly, the voltage applied to the liquid crystal is formed with reference to an electric potential that is lowered by one level. Thus, compared to a case where the reference electric potential Vc is used as the reference, the voltage of the positive polarity side increases, and the voltage of the negative polarity side decreases. In other words, by shifting the center of the amplitude such that the voltage of the positive polarity side is increased by more than that of the negative polarity side, the accumulation currents of the positive polarity and the negative polarity are controlled so as to be close to each other.

As described above, according to the electro-optical device 1 of this embodiment, the following advantages can be acquired.

According to the electro-optical device 1, the control unit 50 adjusts the opposing electrode electric potential Vcom based on the detection data supplied by the detection unit 60 such that the first accumulation current accumulated during the positive-polarity image displaying period and the second accumulation current accumulated during the negative-polarity image displaying period are the same.

In other words, a current detecting operation is performed in real time in parallel with the inversion driving operation, and the result thereof is reflected on the opposing electrode electric potential Vcom. Accordingly, the correction voltage can be adjusted in accordance with the change of the data signal Vid in real time, and thereby the direct-current voltage component that is correlated with the driving voltage can be offset.

Accordingly, an electro-optical device capable of suppressing the occurrence of display problems such as burn-in, compared to a typical electro-optical device, can be provided.

In addition, the adjustment of the opposing electrode electric potential Vcom according to the adjustment flow of FIG. 5 is performed in parallel with the frame inversion driving operation. Thus, for example, a dedicated test mode other than the ordinary display does not need to be performed, and thereby the efficiency of display driving is excellent.

Accordingly, a method of driving an electro-optical device capable of efficiently suppressing the occurrence of display problems such as burn-in can be provided.

In FIG. 6, the absolute value of the detection current that is detected by the detection unit 60 in accordance with a sampling rate is extremely small. For example, when the amplitude of the data signal Vid having the positive polarity is 5 V, the detection current Ia1 is at a level of between several pA to several μA. In addition, the magnitude of the detection current changes in a time series within a frame.

It is difficult to perform an accurate comparison of the positive polarity and the negative polarity by using an instant detection current. However, by using a method of comparing the accumulation current accumulated during the positive-polarity image displaying period with the accumulation current accumulated during the negative-polarity image displaying period as the adjustment flow shown in FIG. 5, the accuracy of detection can be improved. Accordingly, it is possible to accurately detect the degree of bias due to the influence of field-through and a characteristic difference between a component substrate and an opposing substrate, and thereby the opposing electrode electric potential Vcom can be adjusted appropriately.

The detection unit 60 is configured by a simple small-sized configuration that includes a resistor Rs as a current detecting element, an amplifier 61, an AD converter 62, and the like.

In particular, the current detecting element is formed by using a simple configuration in which the resistor Rs is inserted into the wiring 108 that is connected from the Com voltage generating circuit 57 to the opposing electrode Com.

Accordingly, an electro-optical device capable of suppressing the occurrence of display problems such as burn-in can be provided by using a small-sized and simple configuration.

Embodiment 2

Figure 7:
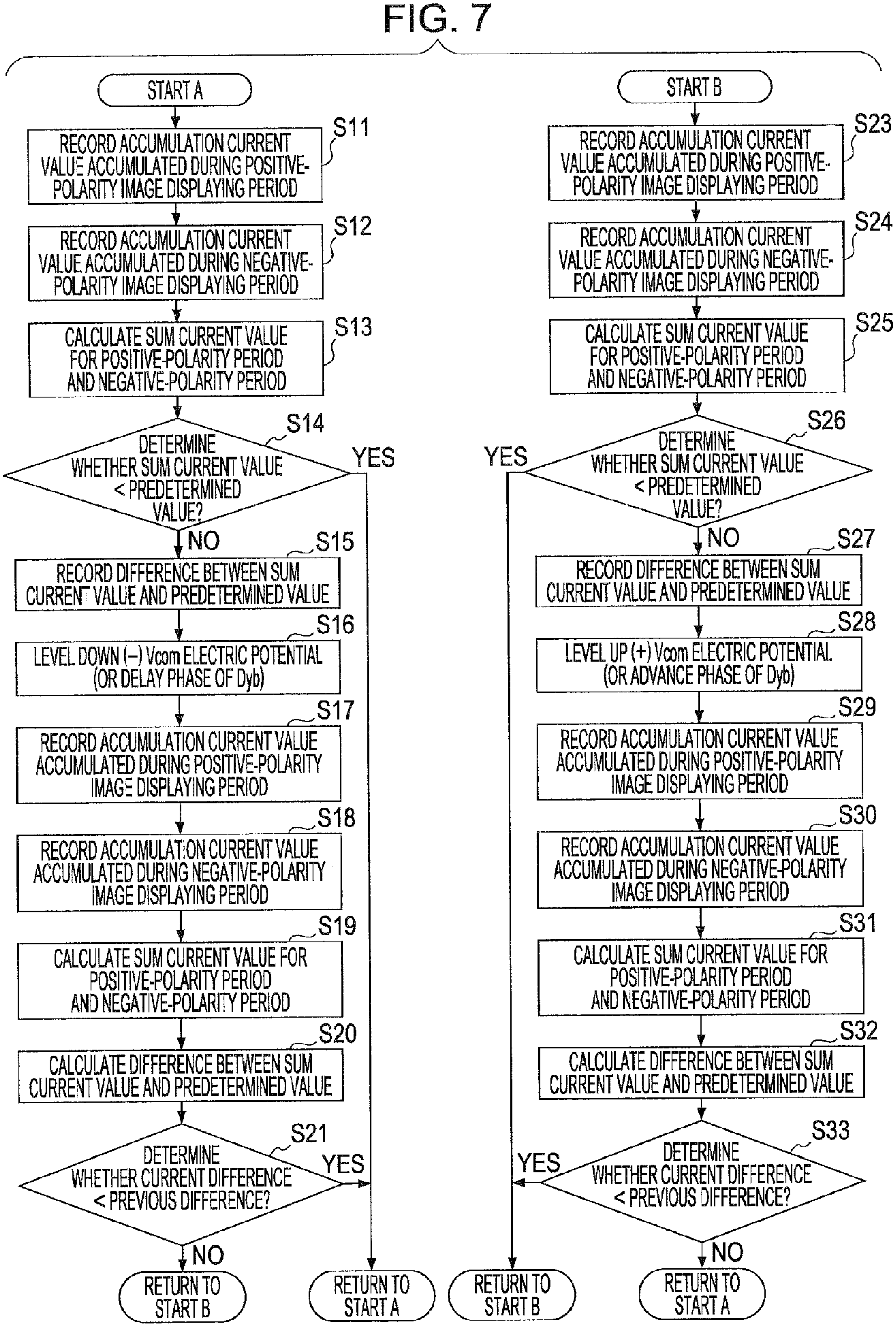
FIG. 7 is a flowchart showing the adjustment method according to Embodiment 2 of the invention.

FIG. 7 is a flowchart showing the adjustment method according to Embodiment 2 of the invention.

Here, the description of the sections that overlap with those in the description of Embodiment 1 are omitted. In addition, to each of the same configuration sections, the same reference numbers have been assigned.

An electro-optical device according to Embodiment 2 has the same configuration as that of Embodiment 1 described with reference to FIGS. 1 to 3. In addition, as a driving method, the frame-inversion driving method shown in FIG. 4 is used. According to Embodiment 2, only the method of adjusting the opposing electrode electric potential is different from that of Embodiment 1.

In particular, according to the adjustment method of Embodiment 1, it is controlled so that the accumulation currents for the positive polarity period and the negative polarity period are the same. However, according to the adjustment method of Embodiment 2, it is controlled so that the summed accumulation current for both the positive-polarity and the negative-polarity periods are smaller than the predetermined current value.

The flowchart shown in FIG. 7 is configured by two flows including flow A that is started from start A and flow B that is started from start B. The frame numbers described below do not represent the specific frames but represents frames that are part of a continuous time series.

First, the operation process of flow A that is started from Step S11 will be described.

In Step S11, a positive-polarity image is displayed in the first frame. In addition, a current flowing through the wiring 108 is detected, and the accumulation current accumulated during the positive-polarity image displaying period is recorded. Step S11, in particular, is the same as Steps S1 to S3 shown in FIG. 5. However, here, for the simplification of description, Steps S1 to S3 are grouped together as one step.

In Step S12, a negative-polarity image is displayed in the following second frame. In addition, a current flowing through the wiring 108 is detected, and an accumulation current accumulated during the negative-polarity image displaying period is recorded. In addition, similar to Step S11, Step S12 is the same as Steps S4 to S6 shown in FIG. 5. However, Steps S4 to S6 are grouped as one step.

In Step S13, the sum current of currents of the first and second frames is calculated by adding the accumulation current accumulated during the negative-polarity image displaying period that is recorded in Step S11 to the accumulation current accumulated during the positive-polarity image displaying period that is recorded in Step S12. As described with reference to FIG. 6, in the first and second frames, the sum current is the current value acquired by adding up the height of the accumulation current Ib1 and the height of the accumulation current Ib2.

In Step S14, it is determined whether the sum current acquired in Step S13 is smaller than a predetermined current value. When the sum current is smaller than the predetermined current value, the process returns back to start A. On the other hand, when the sum current is equal to or larger than the predetermined current value, the process proceeds to Step S15. Here, the predetermined current value is the threshold value that is set in advance based on the design specification of the display panel 10, experimental data, and the like. The predetermined current value is set such that a display problem such as burn-in can be suppressed when the sum current is smaller than the predetermined current value.

In Step S15, a difference (previous difference) is calculated by subtracting the sum current acquired in Step S13 from the predetermined current value, and this difference is stored.

In Step S16, the electric potential of the opposing electrode electric potential Vcom is lowered by one level.

In Step S17, in the third frame, a positive-polarity image is displayed. In addition, a current flowing through the wiring 108 is detected, and the accumulation current accumulated during the positive-polarity image displaying period is recorded.

In Step S18, in the fourth frame, a negative-polarity image is displayed. In addition, a current flowing through the wiring 108 is detected, and the accumulation current accumulated during the negative-polarity image displaying period is recorded.

In Step S19, the sum current is calculated from the currents from the third and fourth frames that are acquired from adding the accumulation current accumulated during the negative-polarity image displaying period that is recorded in Step S17 to the accumulation current accumulated during the positive-polarity image displaying period that is recorded in Step S18.

In Step S20, a difference (recent difference) is calculated by subtracting the sum current acquired in Step S19 from the predetermined current value and this difference is stored.

In Step S21, it is determined whether the recent difference recorded in Step S20 is smaller than the previous difference recorded in Step S15. When the recent difference is smaller than the previous difference, the process returns back to start A. On the other hand, when the recent difference is equal to or larger than the previous difference, the process proceeds to start B.

Here, it is determined whether the sum current has become closer to the predetermined current value by lowering the opposing electrode electric potential Vcom by one level in Step S16. If the recent difference is smaller than the previous difference, the sum current has become closer to the predetermined current value, and the adjustment (correction) direction is correct. Then, flow A is performed again.

Subsequently, flow B will be described.

Here, flow B that is started from Step S23 has a flow that is in principle the same as that of flow A and has many processes that are the same as those of flow A. Thus, only processes that are different from those of flow A will be described.

First, Steps S23 to S25 are the same as Steps S11 to S13 of flow A.

In Step S26, it is determined whether the sum current acquired in Step S25 is smaller than the predetermined current value. When the sum current is smaller than the predetermined current value, the process returns back to start B. On the other hand, when the sum current is equal to or larger than the predetermined current value, the process proceeds to Step S27. In Step S27, a difference (previous difference) is calculated by subtracting the sum current acquired in Step S25 from the predetermined current value, and this difference is stored.

In Step S28, the electric potential of the opposing electrode electric potential Vcom is raised by one level.

In addition, Steps S29 to S32 are the same as the processes of Steps S17 to S20 of flow A. In Step S33, it is determined whether the recent difference recorded in Step S32 is smaller than the previous difference recorded in Step S27. When the recent difference is smaller than the previous difference, the process returns back to start B. On the other hand, when the recent difference is equal to or larger than the previous difference, the process proceeds to start A.

In flow B, the adjustment of raising the opposing electrode electric potential Vcom by one level is performed in Step S28.

In other words, flow B is a flow for performing an adjustment in a direction opposite to that of flow A. By combining flow A and flow B, adjustments (corrections) in both directions, for the raising and lowering the electric potential of the opposing electrode electric potential Vcom, are realized.

As described above, according to this embodiment, the following advantages can be acquired in addition to the advantages of Embodiment 1.

According to the electro-optical device 1, the control unit 50 adjusts the opposing electrode electric potential Vcom based on the detection data supplied by the detection unit 60 such that the sum current acquired by summing the absolute value of the first accumulation current accumulated during the positive-polarity image displaying period and the absolute value of the second accumulation current accumulated during the negative-polarity image displaying period are smaller than the predetermined current value. In addition, the predetermined current value is set to a threshold value for which display problems such as burn-in can be suppressed.

A current detecting operation is performed in real time in parallel with the inversion driving operation, and the result thereof is reflected on the opposing electrode electric potential Vcom. Accordingly, the correction voltage can be adjusted in accordance with the change in the data signal Vid in real time, and thereby a DC voltage component that is correlated with the driving voltage can be offset.

Accordingly, an electro-optical device capable of suppressing the occurrence of display problems such as burn-in compared to a typical electro-optical device can be provided.

As described above, the detection current that is detected by the detection unit 60, for example, is a level of several pA to several μA. In addition, the magnitude of the detection current changes in a time series within a frame. Accordingly, it is difficult to detect the value of the detection current accurately within the electro-optical device.

According to the adjustment flow shown in FIG. 7, by summing the absolute value of the accumulation current accumulated during the positive-polarity image displaying period and the absolute value of the accumulation current accumulated during the negative-polarity image displaying period, the accuracy of detection of the current can be improved. In addition, the opposing electrode electric potential Vcom is adjusted such that the sum current is smaller than the predetermined current value.

Accordingly, an electro-optical device capable of suppressing the occurrence of display problems such as burn-in can be provided.

Embodiment 3

Figure 8:
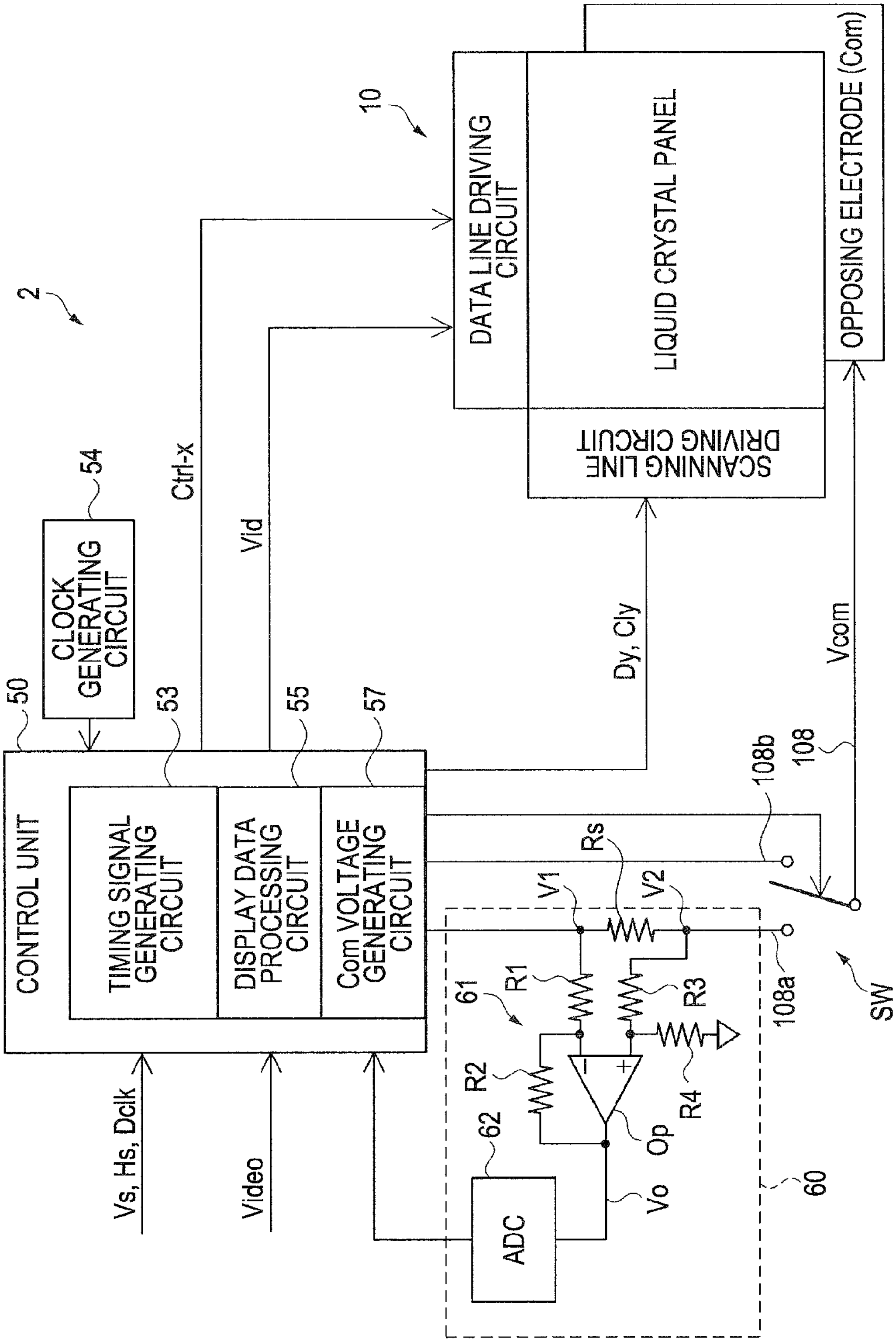
FIG. 8 is a diagram showing a schematic configuration of an electro-optical device according to Embodiment 3 of the invention.

FIG. 8 is a diagram showing a schematic configuration of an electro-optical device according to Embodiment 3 of the invention.

Here, the sections that overlap with those in the description of Embodiment 1 are omitted. In addition, to each of the same configuration sections, the same reference numbers have been assigned.

The electro-optical device 2 according to Embodiment 3 is different from the electro-optical device 1 according to Embodiment 1 as described with reference to FIGS. 1 to 3. The difference being in the electro-optical device 2 there are a path passing through the detection unit and a path not passing through the detection unit that are disposed in the wiring for connecting the control unit and the opposing electrode, and a shift switch is disposed for shifting between the path passing through the detection unit and the path not passing through the detection unit.

In addition, to be described later in detail, the method of adjusting the electric potential of the opposing electrode is partly changed due to the shift switch.

In the electro-optical device 2, the wiring 108 connecting the control unit 50 and the opposing electrode Com includes a wiring **108*a* passing through the detection unit 60 and a wiring 108*b* not passing through the detection unit 60. In addition, the electro-optical device 2 includes the shift switch SW that is used for shifting between the wiring 108*a* and the wiring 108*b***.

The configuration of the electro-optical device 2 according to this embodiment is different from that of the electro-optical device 1 shown in FIG. 1 in that the configuration relating to the shift switch SW has been added.

The shift switch SW, for example, is configured by an analog switch and selects one of the wiring **108*a* and the wiring 108*b* in accordance with a shift signal supplied by the control unit 50. The shift switch SW may be configured so as to be externally attached to a circuit substrate or the like, or may be configured so as to form a shift switch as a part of an internal circuit of the control unit 50**.

When the wiring **108*a* is selected by the shift switch SW, a resistor Rs of the detection unit 60 is included in the circuit, and accordingly, the same circuit configuration as that of the electro-optical device 1 is formed. According to the electro-optical device 2**, this circuit configuration is used as a test circuit.

On the other hand, when the wiring **108*b* is selected by the shift switch SW, a circuit configuration is formed (ordinary circuit) in which the control unit 50** and the opposing electrode Com are directly connected to each other.

Figure 9:
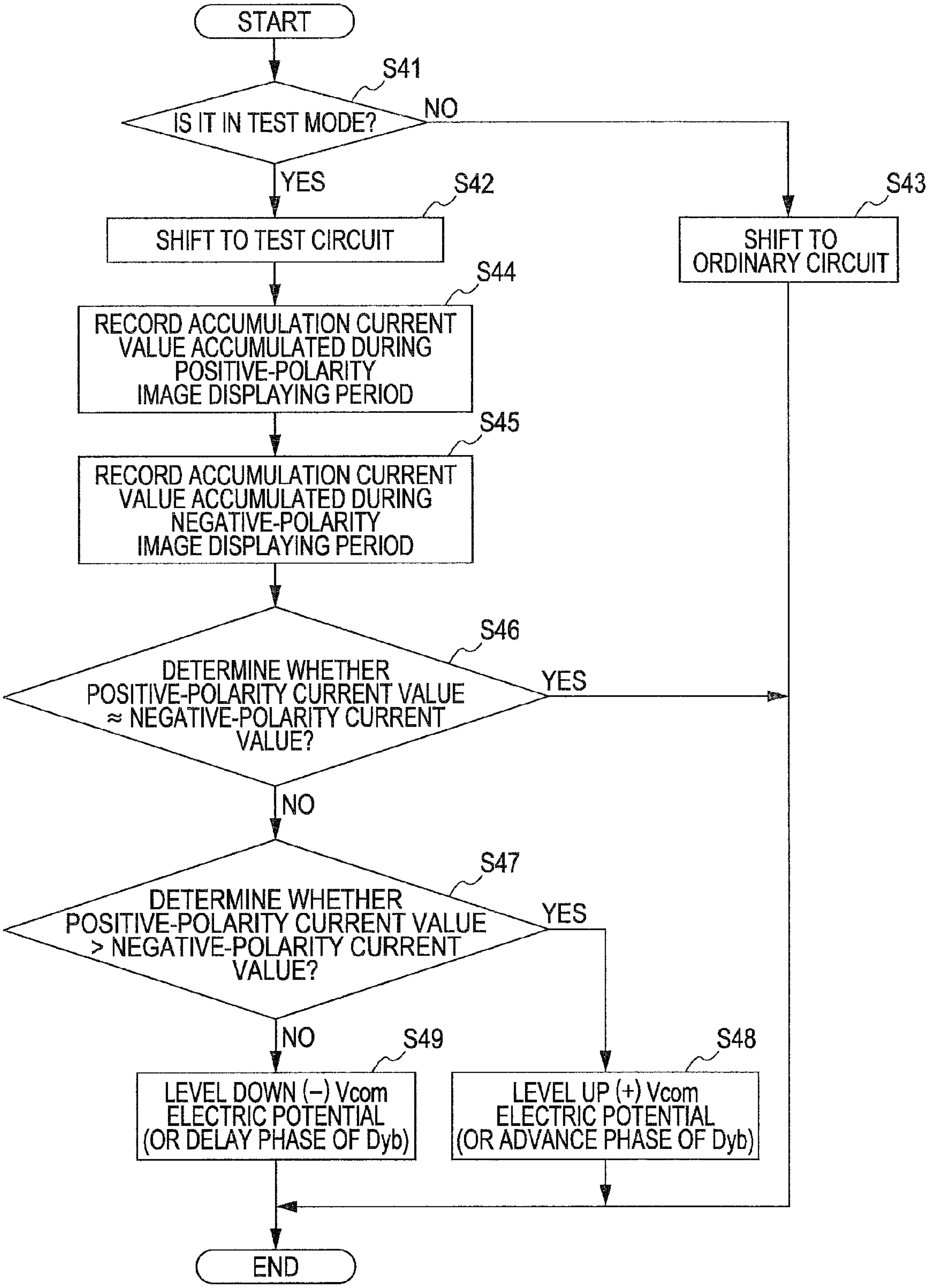
FIG. 9 is a flowchart showing the adjustment method according to Embodiment 3.

FIG. 9 is a flowchart showing the adjustment method according to Embodiment 3.

According to the electro-optical device 2, in accompaniment with the shift switch SW, the method of adjusting the opposing electrode electric potential is also different from that according to Embodiment 1 as described with reference to FIG. 5. Hereinafter, differences between the flow according to Embodiment 3 and the flow shown in FIG. 5 will be focused on in the description. In addition, in the control unit 50, an operation process described below is stored as an adjusting program.

First, according to the electro-optical device 2, a circuit including the detection unit 60 is used as a test circuit, and a circuit not including the detection unit 60 is used as the ordinary circuit. Accordingly, a dedicated test mode is provided, in addition to the ordinary display mode. The test mode is set so as to be performed for cases where power is input, where the test mode is selected by a user, or the like. In addition, for example, when the electro-optical device is mounted on a projector, the test mode may be set so as to be performed when shifting between display modes such as a shift from cinema mode (dark room environment) to standard mode (illuminated environment) is performed.

In Step S41, it is determined whether the current mode is in the test mode. When it is in the test mode, the process proceeds to Step S42. On the other hand, when it is not in the test mode, the process proceeds to Step S43.

In Step S42, the wiring **108*a*** is selected by the shift switch SW so as to convert the circuit into the test circuit.

In Step S43, the wiring **108*b*** is selected by the shift switch SW so as to convert the circuit into the ordinary circuit.

In Step S44, a positive-polarity test image is displayed. In addition, a current flowing through the wiring **108*a*** is detected, and accordingly, an accumulation current accumulated during the positive-polarity image displaying period is recorded.

Step S44 is similar to Steps S1 to S3 shown in FIG. 5, but the displayed image in Step S44 is the test image. In particular, a white image is displayed in entire screen as the test image. For example, in the case of the normally-black mode, a high voltage is applied to the pixel electrode for displaying an image of a high gray scale. Accordingly, it is preferable that an image of a high gray scale is used as the test image.

In Step S45, a negative-polarity test image is displayed. In addition, a current flowing through the wiring 108*a* is detected, and the accumulation current accumulated during the negative-polarity image displaying period is recorded.

In addition, according to this adjustment method, the detection of the current is performed in the dedicated test mode. Accordingly, a dedicated driving frequency for the test mode for which a current can be detected easily may be used. For example, by setting the frequency of the vertical synchronization signal Vs in the test mode to be lower than 60 Hz, such as 30 Hz or 50 Hz, it may be configured that the time per one frame is lengthened, and the accuracy of detection of the current is improved. In addition, it is preferable that the amplitude of the data signal Vid in the test image is about ±5 V.

In addition, Steps S46 to S49 are the same as Steps S7 to S10 shown in FIG. 5. To sum up, while the electric potential of the opposing electrode electric potential is adjusted as needed, the electric potential of the opposing electrode electric potential is controlled so that the accumulation current accumulated during the positive-polarity image displaying period and the accumulation current accumulated during the negative-polarity image displaying period are the same.

Until now, the adjustment method for the case where the flow according to Embodiment 1 shown in FIG. 5 is applied to the electro-optical device 2 has been described. However, the flow according to Embodiment 2 shown in FIG. 7 may be performed in the test mode. In such a case, a routine for checking and branching of the test mode according to Step S41 shown in FIG. 9 is inserted after start A shown in FIG. 7.

As described above, according to this embodiment, the following advantages can be acquired, in addition to the advantages of Embodiment 1.

According to the electro-optical device 2, by performing a shift of the shift switch SW, the wiring 108*a* passing through the detection unit 60 is selected in the test mode, and the wiring 108*b* not passing through the detection unit 60 is selected in the ordinary display mode.

In other words, in the ordinary display mode, the delay of the response time of the liquid crystal and difficulty in the accumulation of electric charges in the holding capacitor due to the influence of inclusion of the resistor Rs as a current detecting element can be eliminated. Accordingly, a clear display can be achieved.

In addition, in the test mode, a dedicated test image or a dedicated driving frequency, for which detection of the current can be performed, can easily be used. Accordingly, the accuracy of detection of the current can be improved.

Accordingly, an electro-optical device capable of performing clear display and reliably suppressing the occurrence of display problems such as burn-in can be provided.

Embodiment 4

Figure 10:
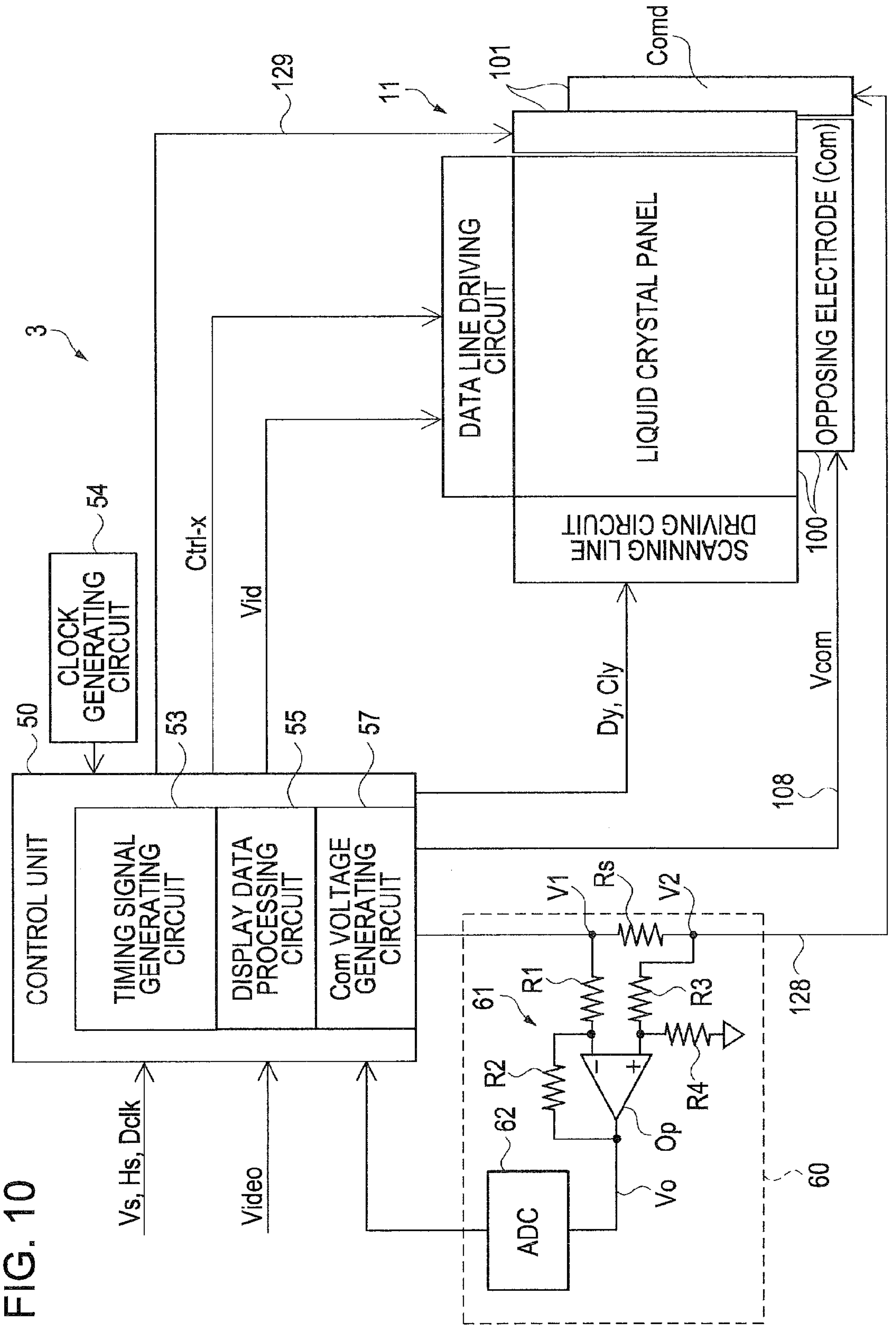
FIG. 10 is a schematic configuration diagram of an electro-optical device according to Embodiment 4 of the invention.
Figure 11A:
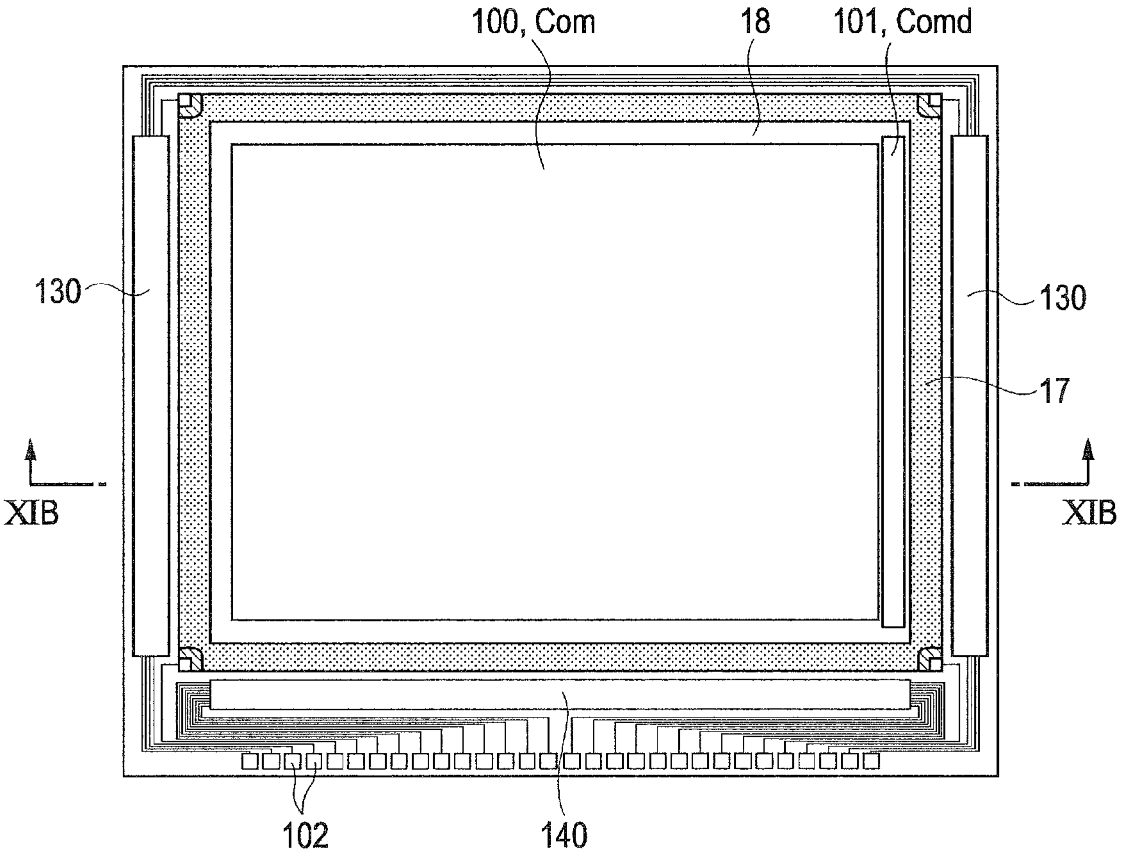
FIG. 11A is a plan view of a display panel.
Figure 11B:
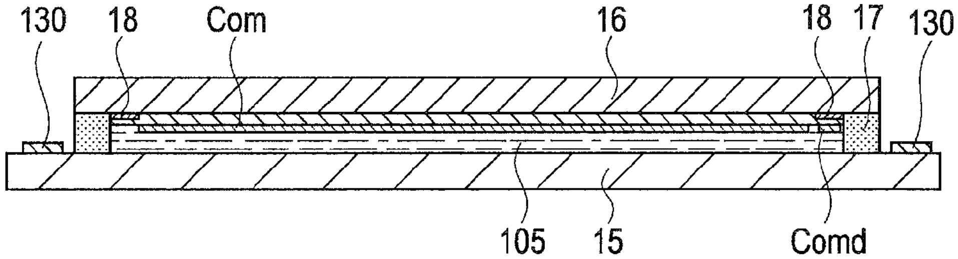
FIG. 11B is a cross-section view taken along line XIB-XIB shown in FIG. 11A.

FIG. 10 is a schematic configuration diagram of an electro-optical device according to Embodiment 4 of the invention. In addition, FIG. 11A is a plan view of a display panel thereof, and FIG. 11B is a cross-section view taken along line XIB-XIB shown in FIG. 11A.

Here, the description of the sections that overlap with those in the description of Embodiment 1 are omitted. In addition, to each of the same configuration sections, the same reference numbers have been assigned.

The electro-optical device 3 according to Embodiment 4 includes a display panel in which a dedicated current detecting area other than the display area is provided. Thus, the detection of a current is performed in the current detecting area in parallel with performing an ordinary display in the display area.

Other configurations of the electro-optical device 3 are the same as those of the electro-optical device 1 according to Embodiment 1 described with reference to FIGS. 1 to 3.

First, the schematic configuration of the display panel 11 according to this embodiment will be described with reference to FIGS. 11A and 11B.

The display panel 11 is configured by pinching a liquid crystal 105 between a component substrate 15 and an opposing substrate 16 that are disposed to face each other.

In addition, the component substrate 15 and the opposing substrate 16 are bonded together by a sealing member 17 that is coated in the shape of a frame along the edge portion of the opposing substrate. In addition, in an area surrounded by the sealing member 17 in the plan view, a liquid crystal 105 is sealed.

The display panel 11, for example, is a liquid crystal light valve of a transmission type that is used for a projector. The display panel 11 performs optical modulation for light incident from the opposing substrate 16 side in accordance with a data signal, and outputs the modulated light from the component substrate 15 side.

Accordingly, on the liquid crystal 105 side of the opposing substrate 16, a light shielding film 18 is disposed for defining a display area 100. The light shielding film 18 forms a frame shape in the plan view that is smaller than the sealing member 17 by one level. An opening portion of the light shielding film 18 becomes the display area 100.

In addition, the display area 100 forms a rectangle that is horizontally long in FIG. 11A. A current detecting area 101 is disposed to the right side of the display area 100.

The current detecting area 101 is overlapped by the light shielding film 18 in the plan view and is formed in a line shape, which is vertically long along one short side of the display area 100.

In other words, an image displayed in the current detecting area 101 does not have any influence on the projected image. In other words, the display panel 11 is configured such that there are no problems even tough a test image other than a display image which is displayed in the display area 100 is displayed in the current detecting area 101.

On the liquid crystal 105 side of the opposing substrate 16, in the area overlapped by the display area 100, an opposing electrode Com is disposed. In addition, in the area overlapped by the current detecting area 101, a dummy opposing electrode Comd is disposed.

On the liquid crystal 105 side of the component substrate 15, a plurality of pixel electrodes 118 (FIG. 3) is formed so as to be overlapping with the display area 100 and the current detecting area 101.

In addition, the pixel electrode 118 and a TFT 116 (FIG. 3) that are formed in the current detecting area 101 are the same as those formed in the display area 100. However, a data signal representing a test image is applied to the pixel electrode formed in the current detecting area.

Next, the circuit configurations of the control unit 50 and the display panel 11 will be described with reference to FIG.

10. The control unit 50 and the opposing electrode Com of the display area 100 are directly connected to each other by the wiring 108.

In addition, the control unit 50 and the dummy opposing electrode Comb of the current detecting area 101 are connected to each other by a wiring 128 through a detection unit 60.

Here, a potential of the opposing electrode electric potential Vcom applied to the opposing electrode Com by the control unit 50 is the same as the potential of the opposing electrode electric potential Vcom applied to the dummy opposing electrode Com by the control unit 50. However, the circuits of the opposing electrode Com and the dummy opposing electrode Comb are formed as so to be independent. In addition, the control unit 50 and pixel electrode of the current detecting area 101 are shown in a simplified manner to be directly connected to each other by the wiring 129. In particular, a selection circuit (not shown) that is used for selecting all TFTs of a plurality of pixels of the current detecting area 101 together is disposed. Data signals representing a same test image are applied to all the pixels within the current detecting area.

In the method of adjusting the opposing electrode electric potential according to this embodiment, both the method according to the flow of Embodiment 1 shown in FIG. 5 and the method according to the flow of Embodiment 2 shown in FIG. 7 can be employed. In addition, since the current detecting area 101 is formed in the area that is overlapping with the light shielding film 18, the current detecting area 101 does not have any influence on the projected image. Accordingly, as a test image, an all-white image which has a high gray scale is used. On the other hand, in the case where a normally-black mode is used, an all-black image is displayed.

It is preferable that the amplitude of the data signal Vid of the test image, for example, is about ±5V.

As described above, according to this embodiment, the following advantages can be acquired in addition to the advantages of Embodiment 1.

According to the electro-optical device 3, the display panel 11 is included in which the dedicated current detecting area 101 is disposed separate from the display area. In addition, the opposing electrode electric potential Vcom is supplied to the wiring 108 which does not pass through the detection unit 60 in the display area, and in the current detecting area 101 the opposing electrode electric potential Vcom is supplied from the wiring 128 which passes through the detection unit 60.

In other words, in the display area, the influence from the inclusion of the resistor Rs as the current detecting element, such as delays in the response of the liquid crystal and difficulty in the accumulation of electric charges in the holding capacitor, can be eliminated. As a result, a clear display can be achieved.

In addition, since the current detecting area 101 is disposed in an area that is not used for display, it is possible to use a dedicated test image, for which detection of a current can be performed in an easy manner, or the like. Accordingly, the accuracy of detection of the current can be improved.

As a result, an electro-optical device capable of performing clear display and reliably suppressing display problems such as burn-in can be provided.

Embodiment 5

Figure 12:
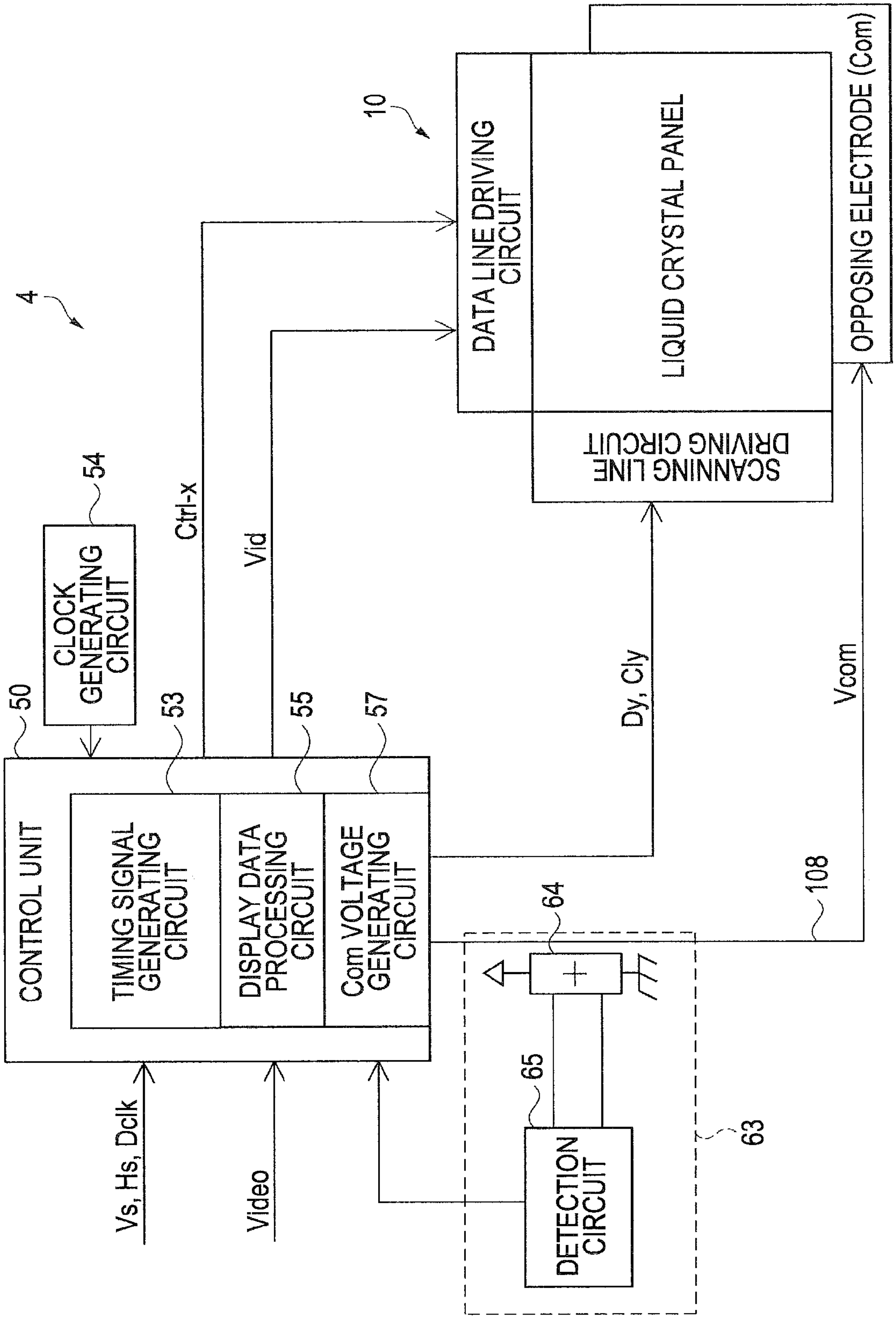
FIG. 12 is a schematic configuration diagram of an electro-optical device according to Embodiment 5 of the invention.

FIG. 12 is a schematic configuration diagram of an electro-optical device according to Embodiment 5 of the invention.

Here, the description of the sections that overlap with those in the description of Embodiment 1 are omitted. In addition, to each of the same configuration sections, the same reference numbers have been assigned.

The electro-optical device 4 according to Embodiment 5 includes a detection unit using a magnetic sensor as a current detecting element. A magnetic field is generated around the wiring which connects the control unit to the liquid crystal panel. The electro-optical device 4 detects the amount of the current flowing in the liquid crystal capacitor through an opposing electrode based on the magnetic field which is generated around the wiring.

The other configurations of the electro-optical device 4 are the same as those of the electro-optical device 1 according to Embodiment 1 as described with reference to FIGS. 1 to 3.

The electro-optical device 4 includes the detection unit 63 which includes the magnetic sensor 64 as the current detecting element. The detection unit 63 is configured by the magnetic sensor 64, a detection circuit 65, and the like.

In addition, in the electro-optical device 4, a control unit 50 and an opposing electrode Com are connected by a wiring 108.

The magnetic sensor 64 is a hall element. The magnetic sensor 64 is mounted near the wiring 108 and detects the intensity of a magnetic field that is generated in accordance with flow of a current through the wiring 108. Then, the magnetic sensor 64 outputs a voltage (analog detection data) to the detection circuit 65 according to the detected intensity of the magnetic field.

The current detecting element is not limited to a hall element. Thus, any magnetic sensor that can detect the intensity of a magnetic field may be used as the current detecting element. For example, a configuration can be used in which a current transformer or a magnetoresistance effect element is employed.

The magnetic sensor 64, for example, is disposed in a position apart from the other electronic components and wirings by a predetermined distance in a circuit substrate (not shown), on which the control unit 50 is mounted, so that the magnetic sensor 64 is not easily influenced by the magnetic field that is generated from the electronic components or the wirings.

In addition, the wiring 108 is located in a portion close to the mounting position of the magnetic sensor 64, and is also wired in a position apart from peripheral electronic components or the like by a predetermined distance, and is configured to have a large width. In particular, the wiring 108 is disposed to be locally widened in accordance with the size of the magnetic sensor 64. For example, the magnetic sensor 64 is mounted on the wiring 108 having a large width. An insulation layer such as a resist is provided between the magnetic sensor 64 and the wiring 108.

Alternatively, for example, a configuration may be used in which the magnetic sensor 64 is mounted on an FPC that connects the control unit 50 and the display panel 10. In such a case, for example, the magnetic sensor 64 can be mounted on a surface opposite to the surface on which the wiring 108 is disposed. It is preferable that the magnetic sensor 64 overlaps the wiring 108 in plan view. As the FPC is thin, a magnetic field can also be detected well using such a configuration.

The detection circuit 65 is configured to include an amplifier, an AD converter, and the like that are selected in accordance with the characteristics of the magnetic sensor 64. The detection circuit 65 encodes the analog detection data detected by the magnetic sensor 64 and transmits the encoded analog detection data to the control unit 50.

As a method of adjusting the opposing electrode electric potential according to this embodiment, the method according to the flow of Embodiment 1 shown in FIG. 5 or the method according to the flow of Embodiment 2 shown in FIG. 7 may be employed.

As described above, according to this embodiment, the following advantages can be acquired in addition to the advantages of Embodiment 1.

The electro-optical device 4 includes the detection unit 63 which uses the magnetic sensor 64 as the current detecting element. In addition, the detection unit 63 detects the amount of a current flowing in the liquid crystal capacitor through the opposing electrode Com based on the magnetic field that is generated around the wiring 108 which connects the control unit 50 and the display panel 10.

In other words, in the display panel, the influence, such as delays in the response time of the liquid crystal and difficulty in the accumulation of electric charges in the holding capacitor due to inclusion of the resistor Rs as a current detecting element, can be eliminated. Accordingly, a clear display can be achieved.

Accordingly, an electro-optical device capable of performing clear display and suppressing the occurrence of display problems such as burn-in can be provided.

Embodiment 6

Figure 13:
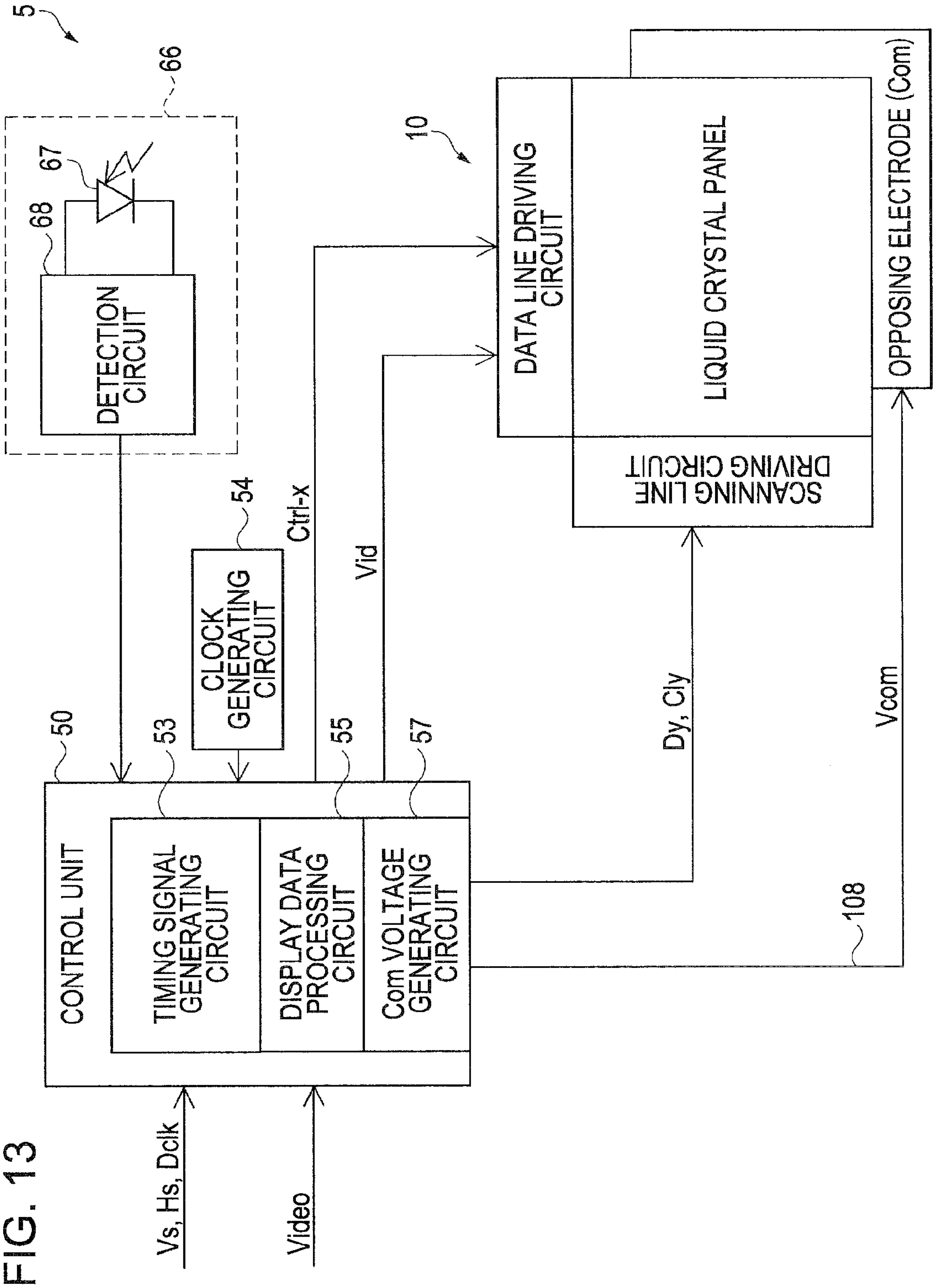
FIG. 13 is a schematic configuration diagram of an electro-optical device according to Embodiment 6 of the invention.

FIG. 13 is a schematic configuration diagram of an electro-optical device according to Embodiment 6 of the invention.

Here, the description of the sections that overlap with those in the description of Embodiment 1 are omitted. In addition, to each of the same configuration sections, the same reference numbers have been assigned.

To be described later in detail, when inversion driving where the polarity of a driving voltage is inverted every frame of an image signal is utilized, a current flowing through the liquid crystal capacitor can be predicted based on each response time (time constant) of the liquid crystal for the positive-polarity image displaying period and the negative-polarity image displaying period. In other words, there is correlation between the current flowing through the liquid crystal capacitor and the response time of the liquid crystal.

In consideration of this point, the electro-optical device 5 according to Embodiment 6 has a detection unit that includes an optical sensor. Thus, in the electro-optical device 5 according to Embodiment 6, the response time that is required to obtain a predetermined luminance of the display luminance is measured, and the adjustment of the opposing electrode electric potential is performed based on the result of the measurement.

In addition, in this embodiment, it is premised that the display panel is used as the liquid crystal light valve of the projector, and the response time is measured by measuring the luminance of a projected image by using the optical sensor.

Other configurations of the electro-optical device 5 are the same as those of the electro-optical device 1 according to Embodiment 1 described with reference to FIGS. 1 to 3.

The electro-optical device 5 has a detection unit 66 that is configured to include an optical sensor 67 formed of a photo diode. Here, a sensor that can detect luminance can be used as the optical sensor 67. For example, the optical sensor 67 may be a photo transistor or a Cds cell.

The optical sensor 67 is disposed in a place in which light (projected light) output by the display panel 10 can be received. The optical sensor 67 outputs a current corresponding to the luminance of the projected light.

The detection unit 66 includes a detection circuit 68 and the like in addition to the optical sensor 67. The detection circuit 68 is configured to include an amplifier, an AD converter, and the like that are selected in accordance with the characteristics of the optical sensor 67. Accordingly, the analog detection data detected by the optical sensor 67 is transmitted to the control unit 50 as encoded luminance data.

In addition, in the electro-optical device 5, the control unit 50 and the opposing electrode Com are connected by the wiring 108.

Figure 27:
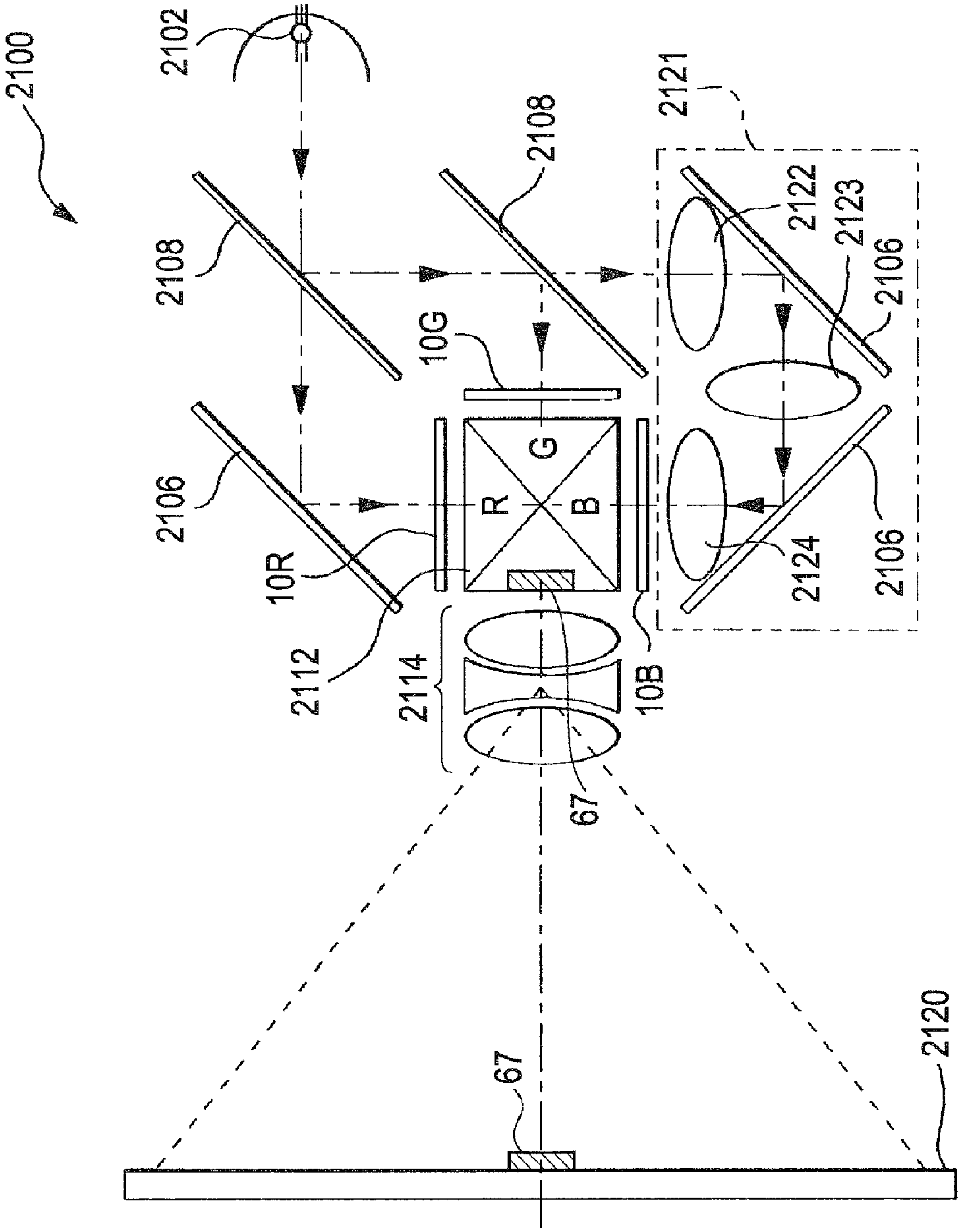
FIG. 27 is a plan view showing the configuration of a projector according to an embodiment of the invention.

FIG. 27 is a schematic configuration diagram of a three-plate type projector.

Here, a detailed dispositional pattern of an optical sensor will be described.

In the projector 2100 shown in FIG. 27, three display panels 10 are used. Three display panels 10 are used for performing optical modulation for R light, G light, and B light. In addition, a dichroic prism 2112 forming an approximate cube faces the continuous three faces of the display panels and is sequentially disposed in the order of the display panels 10R, 10G, and 10B.

In addition, on the face (output face) of the dichroic prism 2112 that is located opposite to the disposition face of the display panel 10G, a lens unit 2114 is disposed.

To the display panels 10R, 10G, and 10B, R light, G light, and B light are incident. After the light is modulated by each display panel, the light is composed by the dichroic prism 2112 and is output from the output face of the dichroic prism. Then, the full-color projected light that is output is projected on an enlarged scale by the lens unit 2114, and whereby the projected image is displayed on a screen 2120. Other detailed optical configurations will be described later.

Here, the optical sensor 67, for example, is disposed above the output face of the dichroic prism 2112. The light receiving portion of the optical sensor 67 is disposed toward the lens unit 2114 side. In particular, part of the projected light output from the dichroic prism is reflected from the lens unit, and the light receiving portion of the optical sensor 67 is disposed so as to receive the reflected light.

<<Method of Adjusting Vcom>>

Figure 14:
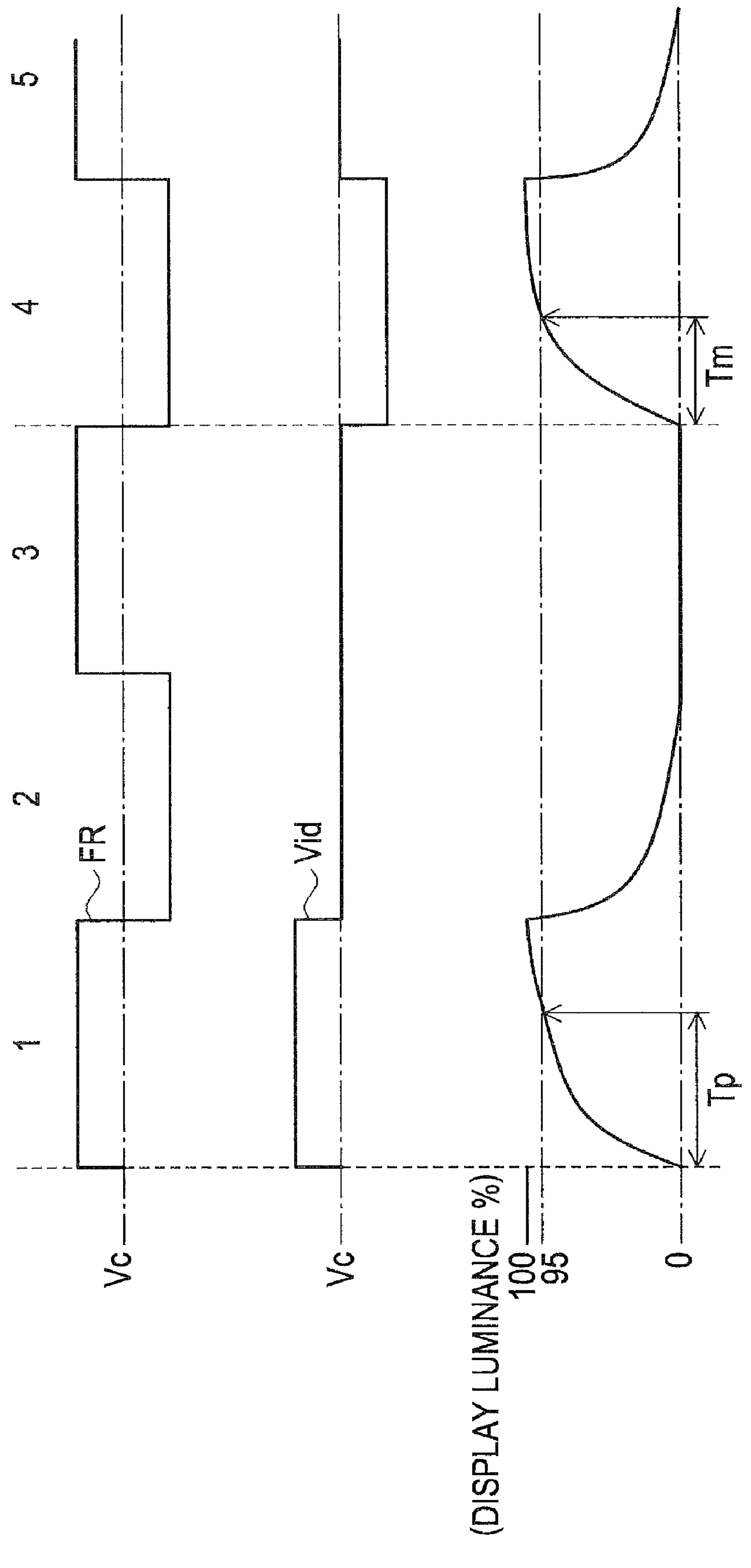
FIG. 14 is a timing chart showing one form of the adjustment method according to Embodiment 6.

FIG. 14 is a diagram showing one form of a timing chart for the adjustment method according to this embodiment. Here, the principle of the adjustment method according to this embodiment will be described.

In FIG. 14, a waveform located on the upper side represents an alternating signal FR, a waveform located in the middle represents a data signal Vid, and a graph located on the lower side represents the change of luminance.

In the waveform located in the middle, the data signal Vid is a driving voltage which has the same magnitude (amplitude) in terms of the positive-polarity image displaying period and the negative-polarity image displaying period with a reference electric potential Vc used as the reference. In particular, a driving voltage of a high gray scale corresponding to a white image is applied with the positive-polarity in the first frame and the negative-polarity in the fourth frame, in synchronization with shift of the alternating signal FR between the positive polarity and the negative polarity. In addition, in the second frame and the third frame, the response state of the liquid crystal is reset, and a driving voltage which has the amplitude of 0 V, that is, a driving voltage corresponding to a black image, is applied.

The application time of the driving voltage which has the amplitude of 0 V is not limited to the two frame periods. Thus, the application time of the driving voltage which has the amplitude of 0 V, for example, may be four frame periods. As this period is lengthened, the liquid crystal can be more assuredly set to the initial state.

The graph located on the lower side represents the transition of the display luminance of the liquid crystal panel for the positive-polarity image displaying period and the negative-polarity image displaying period. In the graph, the vertical axis denotes the luminance level in percentage, and the horizontal axis is a time axis. The timing on the time axis of the graph is matched to that of the time axes of the waveforms located on the upper side and in the middle graphs.

In addition, luminance of 100% represents, for example, luminance reached at the timing when the positive-polarity image displaying period ends. In other words, the luminance of 100% represents the level of luminance just before shifting from the first frame to the second frame. This applies the same to the negative-polarity image displaying period.

Here, a response time until a luminance of 95% is reached in the positive-polarity image displaying period is denoted by Tp, and similarly, a response time until a luminance of 95% is reached in the negative-polarity image displaying period is denoted by Tm. Here, the predetermined luminance is set to the luminance of 95%. However, the predetermined luminance is not limited thereto. Thus, it is preferable that the predetermined luminance is appropriately set based on the specifications of the display panel and the like.

Here, the response times Tp and Tm can be considered to be indices representing the easiness of the flow of a current for the positive-polarity image displaying period and the negative-polarity image displaying period.

For example, when the response time Tp is longer than the response time Tm, a resistance component during the positive-polarity image displaying period is large, and it is considered that a current cannot flow easily.

In such a case, the opposing electrode electric potential is adjusted in a direction in which the positive-polarity voltage increases.

Similarly, when the response time Tm is longer than the response time Tp, a resistance component during the negative-polarity image displaying period is large, and it is considered that a current cannot flow easily. In such a case, the opposing electrode electric potential is adjusted in a direction in which the negative-polarity voltage increases.

As described above, by adjusting the response time Tp to be almost the same as the response time Tm, transient current) flowing through the liquid crystal capacitor can be decreased because the transient current correlates with the response time.

Figure 15:
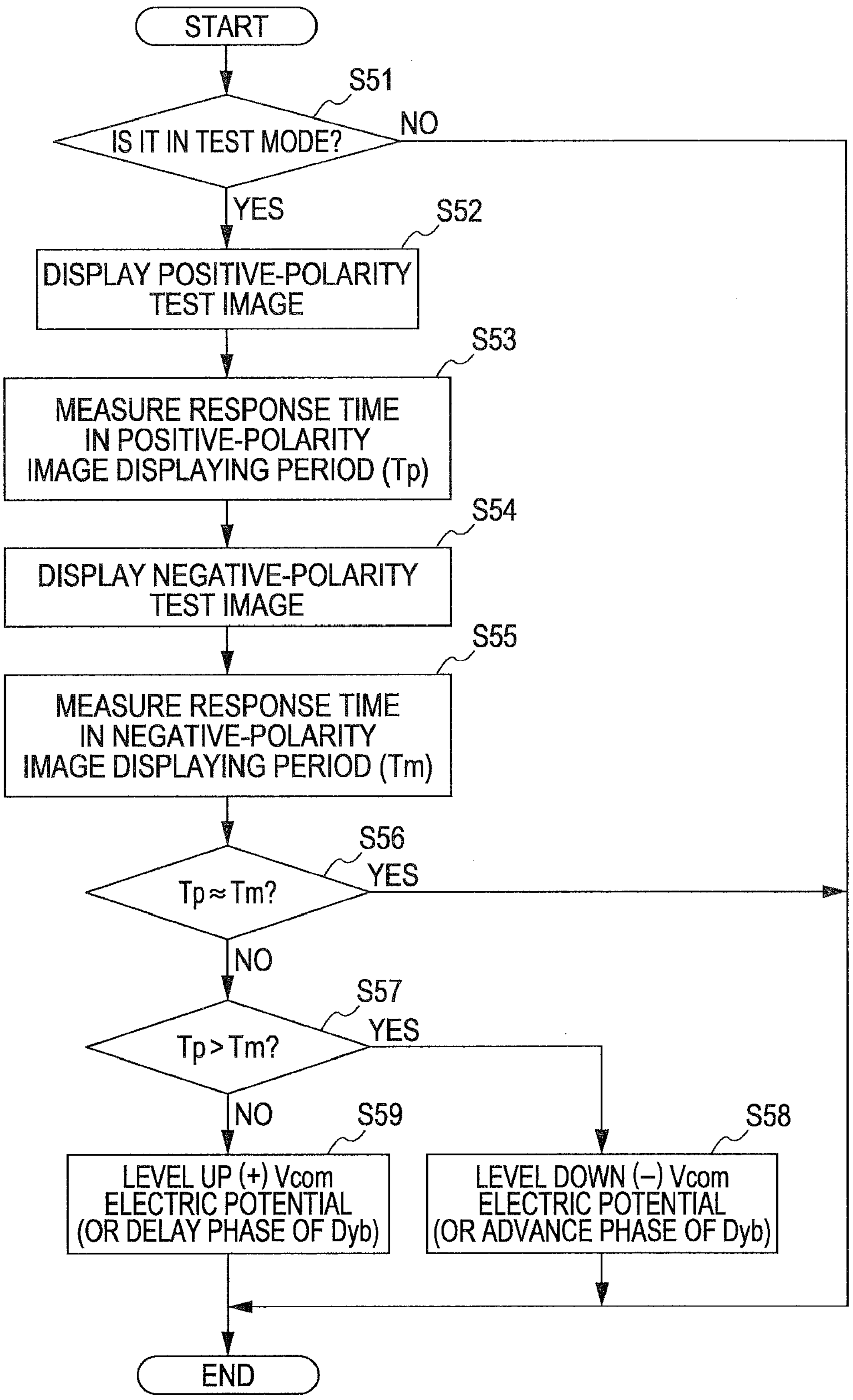
FIG. 15 is a flowchart showing the adjustment method according to Embodiment 6.

FIG. 15 is a flowchart showing an adjustment method according to Embodiment 6.

Hereinafter, the adjustment method will be described with focus on the difference between the flow of the adjustment method and the flow shown in FIG. 5. In addition, in the control unit 50, the operation process described below is stored as the adjustment program.

Here, it is assumed that the electro-optical device 5 is assembled into a projector 2100 shown in FIG. 27. In addition, a test mode is set so as to be performed for cases where power of the projector is turned on, the test mode is selected by a user, or the like. In addition, for example, the test mode may be performed at the time of the shift between display modes such as the shift from cinema mode (dark room environment) to standard mode (illuminated environment).

In the projector 2100, three display panels 10R, 10G, and 10B are mounted. Accordingly, a test operation is performed for each one of the display panels in the test mode. In other words, the flow shown in FIG. 5 is performed three times consecutively for light of each of the colors of RGB.

In Step S51, it is determined whether the current mode is in the test mode. When it is in the test mode, the process proceeds to Step S52. On the other hand, when it is not in the test mode, the process ends. In Step S52, a positive-polarity test image is displayed. The test image is represented as the display of a red color in the entire display area for the case of the display panel 10R, as the display of a green color in the entire display area for the case of the display panel 10G, and as the display of a blue color in the entire display area for the case of the display panel 10B. Image data supplied to the display panel 10R, the display panel 10G and the display panel 10B should be the ones of high gray scale that provide a white image when the above-described three images are composed.

In addition, in the test mode, all the scanning lines (all the TFTs) are selected altogether, and test image data is written to all of the TFTs.

In Step S53, a response time Tp until luminance data, which is supplied by the detection unit 66, reaches 95% is measured, with the rise in the data signal Vid of a positive-polarity test image being used as a start point. In addition, in regard to the luminance of 100% and the luminance of 95%, data derived based on the design specifications, experimental results, and the like in advance are stored in the memory section of the control unit 50, for example, in a data table.

In Step S54, a negative-polarity test image is displayed. The test image is the same as that described in Step S52 except that the test image has the negative-polarity. In addition, before displaying the negative-polarity test image, as described with reference to FIG. 14, a driving voltage having the amplitude of 0 V that is used for resetting the response state of the liquid crystal is applied over two frame periods.

In Step S55, a response time Tm until luminance data, which is supplied by the detection unit 66, reaches 95% is measured, with a fall in the data signal Vid of a negative-polarity test image being used as a start point.

According to this adjustment method, detection of luminance is performed in the dedicated test mode. Therefore, a driving frequency dedicated for the test mode for which luminance can be detected easily can be used. For example, by setting the frequency of the vertical synchronization signal Vs to a frequency lower than 60 Hz, such as 30 Hz or 50 Hz in the test mode, the time for each frame may be lengthened to improve the accuracy of detection of luminance. In addition, it is preferable that the amplitude of the data signal Vid of the test images for example, is about ±5 V.

In Step S56, it is determined whether the response time Tp and the response time Tm are the same. When the response times Tp and Tm are the same, this flow ends. Otherwise, the process proceeds to Step S57.

The determination that the response times are the same is not limited to a case where the absolute values are the same. Thus, there may be a range of values in which both can be determined to be substantially the same.

In Step S57, it is determined whether the response time Tp is longer than the response time Tm. When the response time Tp is longer than the response time Tm, the process proceeds to Step S58. On the other hand, when the response time Tp is shorter than the response time Tm, the process proceeds to Step S59.

In Step S58, the electric potential of the opposing electrode electric potential Vcom is lowered by one level, and then, this flow ends.

In Step S59, the electric potential of the opposing electrode electric potential Vcom is raised by one level, and then, this flow ends.

Description will be followed with reference to FIG. 27 again.

In the above-description, the case where the optical sensor 67 is disposed inside the projector 2100 has been described. However, for example, when adjustment is performed only at the time of a shipment test, the configuration of the optical sensor 67 and the detection unit 66 may be omitted.

In such a case, the optical sensor 67 is disposed on a screen 2120 onto which light is projected, the configuration of the detection unit 66 is assembled into an external test device (not shown), and the detected luminance data is transmitted to the projector 2100.

As described above, according to this embodiment, the following advantages can be acquired in addition to the advantages of Embodiment 1.

According to the electro-optical device 5, the detection unit 66 that includes the optical sensor 67 is provided. In addition, the response time Tp until the predetermined luminance is reached in the positive-polarity image displaying period and the response time Tm until the predetermined luminance is reached in the negative-polarity image displaying period are measured. Then, the opposing electrode electric potential Vcom is adjusted in the direction in which the response times Tp and Tm will become the same.

In other words, the adjustment is performed by predicting a current by using the response time of the liquid crystal based on the correlation between the current flowing through the liquid crystal and the response time of the liquid crystal.

In other words, in the display panel, the influences, such as delays in the response time of the liquid crystal and difficulty in the accumulation of electric charges in the holding capacitor due to inclusion of the resistor Rs as a current detecting element, can be eliminated. Accordingly, a clear display can be achieved.

In addition, the measurement of the response time is performed by using a test image of which luminance can be measured easily, and a dedicated driving frequency can be used. Accordingly, the accuracy of prediction of the current can be improved. Accordingly, an electro-optical device capable of performing clear display and suppressing the occurrence of display problems such as burn-in can be provided.

Embodiment 7

Figure 16:
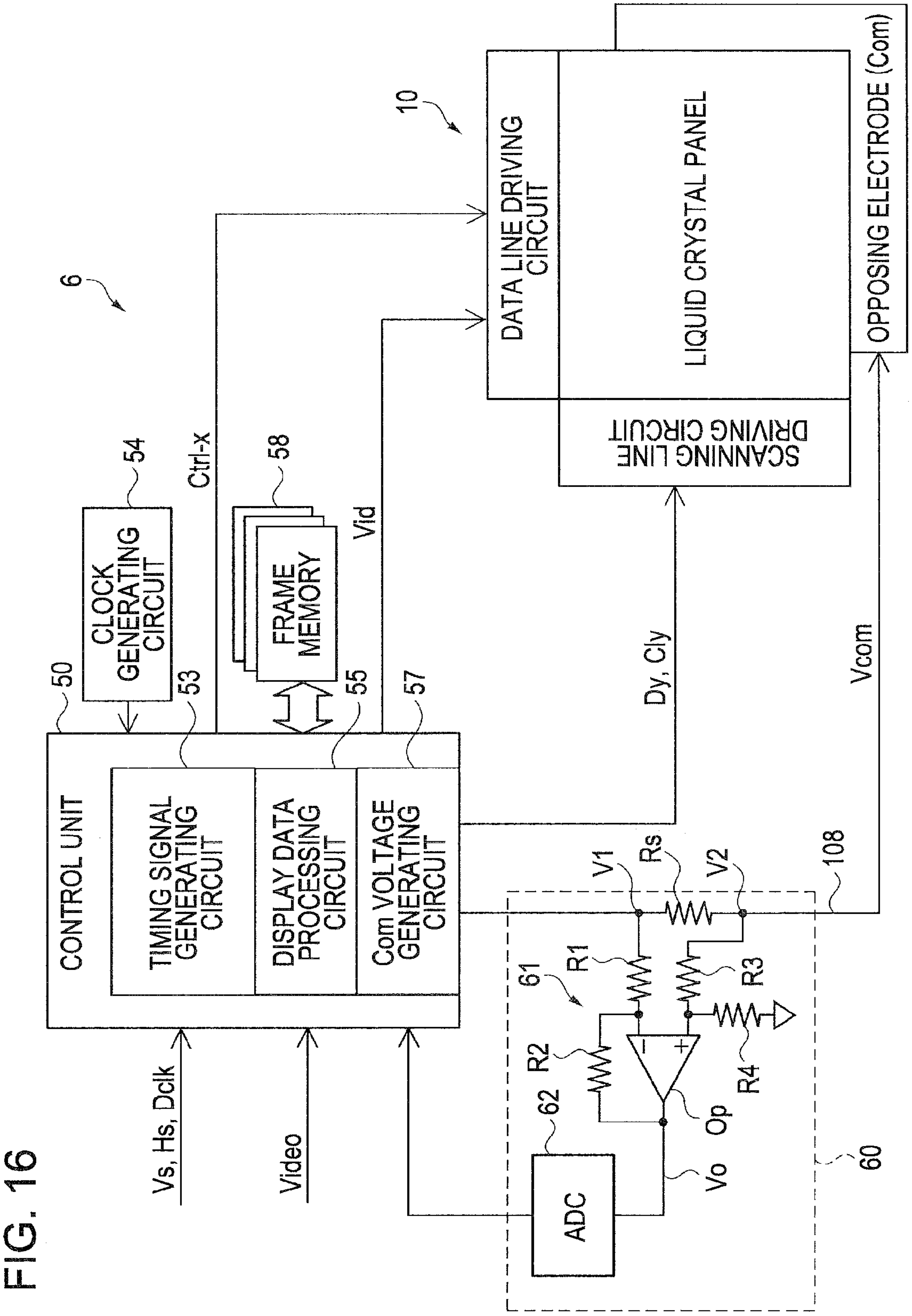
FIG. 16 is a schematic configuration diagram of an electro-optical device according to Embodiment 7 of the invention.

FIG. 16 is a schematic configuration diagram of an electro-optical device according to Embodiment 7 of the invention.

Here, the description of the sections that overlap with those in the description of Embodiment 1 are omitted. In addition, to each of the same configuration sections, the same reference numbers have been assigned.

In the electro-optical device 6 according to Embodiment 7, one frame is divided into two fields in a time series, and double-speed driving in which positive-polarity image display and negative-polarity image display are performed within one frame. Accordingly, in a control unit, a frame memory is mounted that is used for implementing double-speed driving.

The other configurations of the electro-optical device 6 are the same as those of the electro-optical device 1 according to Embodiment 1 as described with reference to FIGS. 1 to 3.

In the control unit 50 of the electro-optical device 6, the frame memory 58 is mounted. In particular, the frame memory 58 is attached to a display data processing circuit 55 of the control unit 50, and the frame memory 58 has memory capacity for storing at least two frames of display data Video that are supplied from an external device. In addition, configurations other than the mounting of the frame memory 58 are the same as those of the electro-optical device 1 according to Embodiment 1.

<<Method of Driving Display>>

Figure 17:
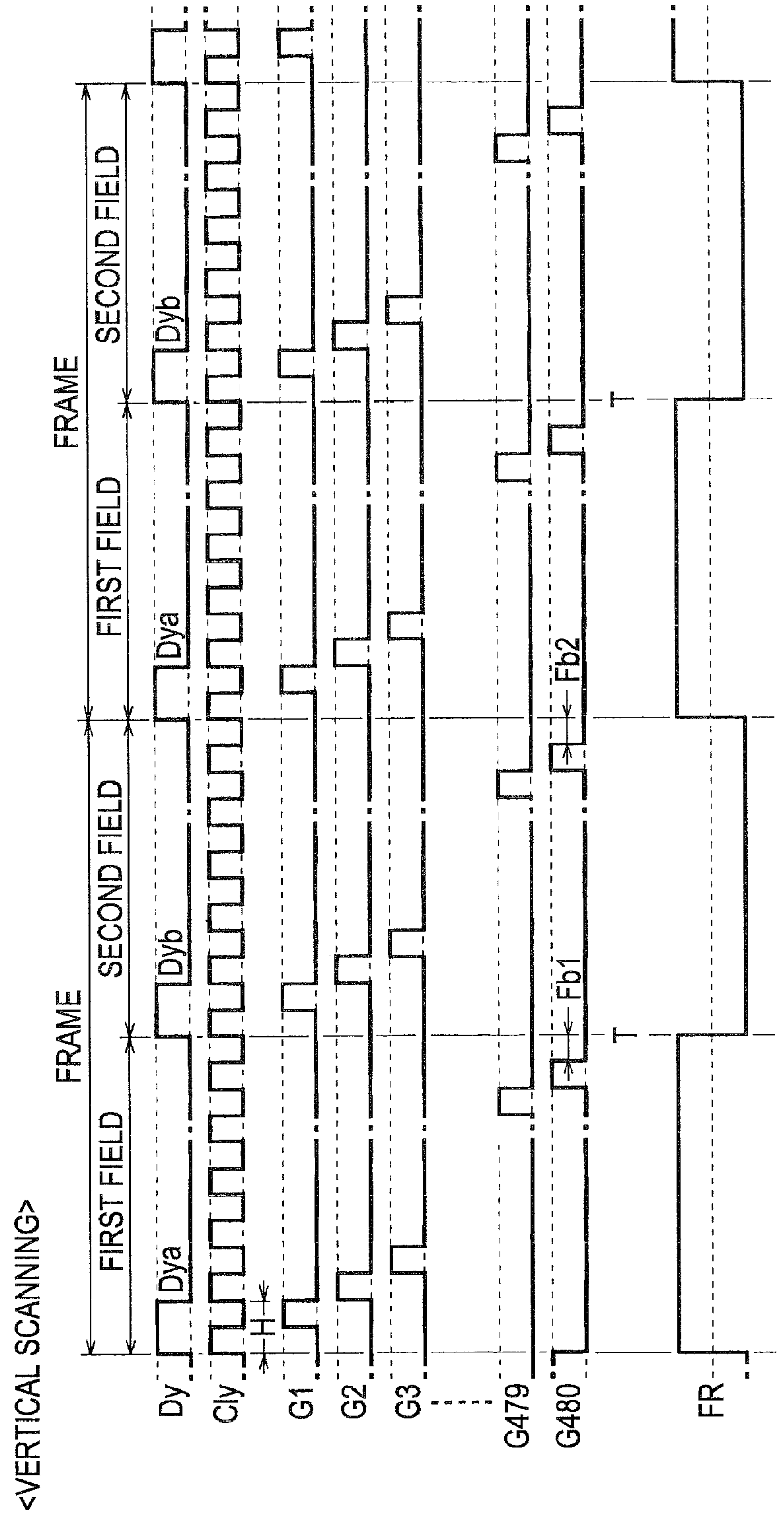
FIG. 17 is a timing chart for the driving method according to Embodiment 7.

FIG. 17 is a timing chart for the driving method according to Embodiment 7.

Here, the principle of the method of driving display in the electro-optical device according to this embodiment will be described with reference to FIG. 17.

According to Embodiment 7, in each of the first and second fields, scan driving by using one scanning line is performed in the order of the scanning lines from the 1st, 2nd, 3rd, 4th, . . . , 479th, and the 480th row. In addition, the double-speed driving is employed in which the polarity of the data signal in each field is inverted. In particular, the control unit 50 stores the display data video that is supplied from an external higher-level device in the frame memory 58. Then, when a scanning line of a specific pixel row is selected in the display panel 10, the control unit 50 reads out the display data of the specific pixel row at double the storing speed.

Then, in the first and second fields, the read-out display data is written at double speed in the order of scanning lines from the 1st to the 480th row.

FIG. 17 is a timing chart of the scanning signal series. As shown in FIG. 17, one frame is configured by a first field and a second field.

First, a scanning signal G1 that is supplied to the uppermost scanning line is output at a timing delayed by a half period after a clock signal Cly rises for the first time after a start pulse Dya is supplied. Then, following the scanning signal G1, scanning signals G2 to G480 are sequentially output to be the level H over a period of a half period of the clock signal every time the logical level of the clock signal Cly is changed.

Accordingly, as shown in FIG. 17, in the first field, the scanning lines from the 1st row to the 480th row are selected in accordance with supply of a start pulse Dya. In addition, in the second field, the scanning lines of the 1st row to the 480th row are selected in accordance with supply of a start pulse Dyb. The rise of the start pulse Dyb coincides with a timing T. Here, the timing T represents the timing of a 240th period of the clock signal Cly from the start pulse Dya, that is, the center timing of one frame.

In addition, the inversion of the polarity of the data signal is defined by an alternating signal FR. The alternating signal FR rises in synchronization with the start pulse Dya, and the signal level of the alternating signal FR is inverted in accordance with the rise of the start pulse Dyb. In other words, the alternating signal FR is a square wave which has a period in which the alternating signal has the level H in the first field and has the level L in the second field.

The polarity of the data signal is inverted in correspondence with the level H or L of the alternating signal FR. In particular, the data signal is converted into a positive-polarity voltage in the first field and is converted into a negative-polarity voltage in the second field, and whereby the polarity of data signal is inverted within one frame.

In addition, a flyback time Fb1 is provided in the period between the time when the 480th scanning line is selected in the first field and the time when the 1st scanning line is selected in the second field. Similarly, a flyback time Fb2 is provided in the period between the time when the 480th scanning line is selected in the second field and the time when the 1st scanning line is selected in the first field of the next frame.

<<First Adjustment Method>> when the double-speed driving according to Embodiment 7 is employed, two kinds of adjustment methods may be used. In the two adjustment methods, it is common that a current flowing through the liquid crystal capacitor is detected, and the adjustment is performed based on the result of the detection. However, there is a difference in the method of adjusting an effective value of the voltage between the two adjustment methods.

In particular, according to the first adjustment method, the effective value of the voltage is adjusted by adjusting Vcom described in Embodiment 1 and Embodiment 2.

According to a second adjustment method, the effective value of the voltage for the positive polarity and the negative polarity is adjusted by adjusting the ratio of the length of the positive-polarity period to the length of the negative-polarity period in one cycle of the data signal.

Here, first, the first adjustment method will be described.

Figure 18:
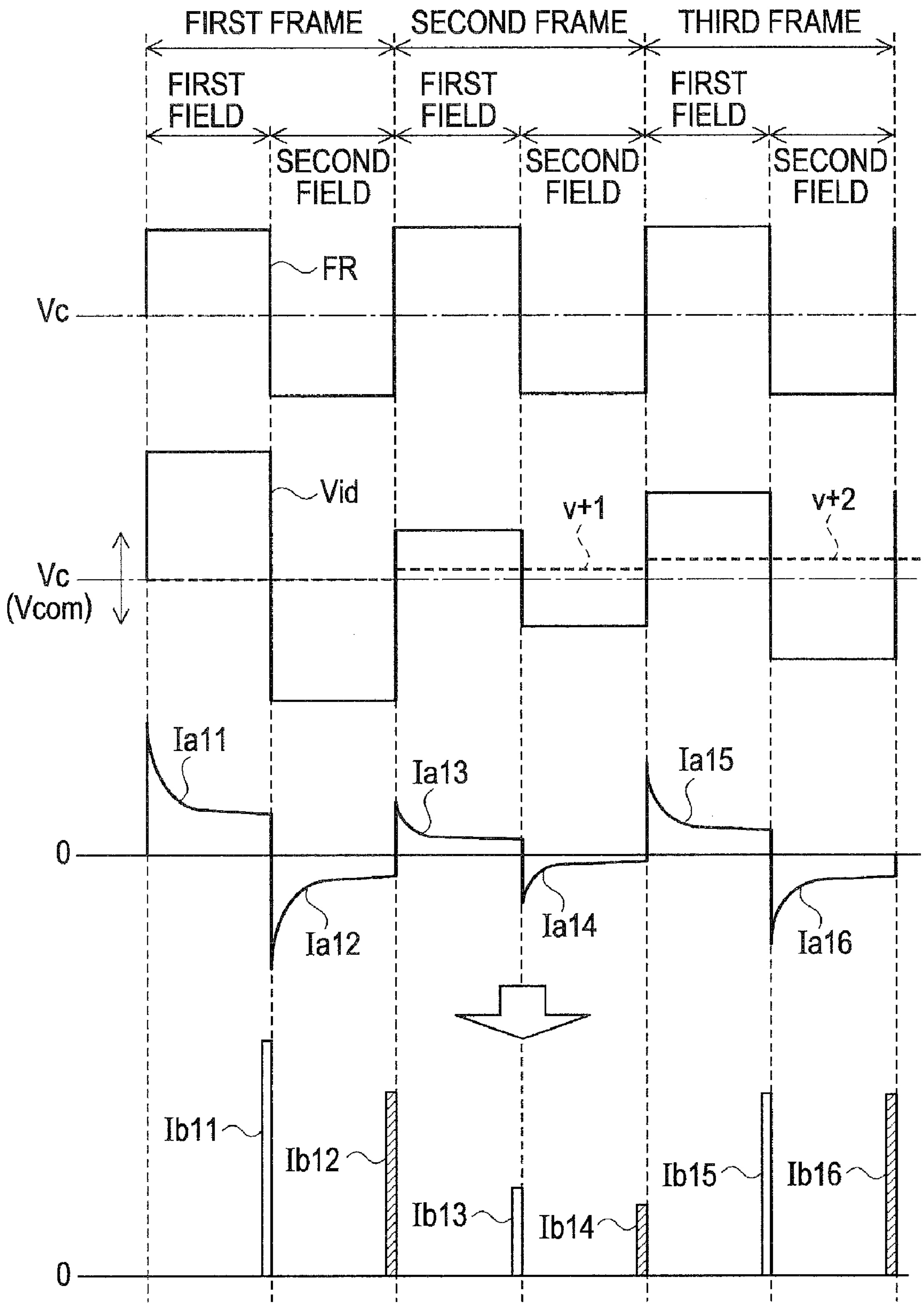
FIG. 18 is a timing chart of one form of the adjustment method according to Embodiment 7.

FIG. 18 is a timing chart of one form of the adjustment method according to this embodiment. FIG. 18 corresponds to FIG. 6.

Here, the description will be followed by a comparison of FIG. 18 and FIG. 6.

FIG. 18 is one form of a timing chart for the case where the adjustment flow of FIG. 5 is performed in the electro-optical device 6 according to this embodiment.

When the adjustment flow of FIG. 5 is applied to this embodiment, the word ‘frame’ in description of FIGS. 5 and 6 is paraphrased with a word ‘field’. In particular, in the method shown in FIGS. 5 and 6, adjustment is performed with two consecutive frames of the positive polarity and the negative polarity regarding them as one period. However, according to this embodiment, the adjustment is performed with two fields of the positive polarity and the negative polarity, with one frame used as one period.

In other words, in the double-speed driving, the opposing electrode electric potential Vcom is adjusted such that a current flowing during the positive-polarity image displaying period (the first field) and a current flowing during the negative-polarity image displaying period (the second field) are the same.

Hereinafter, FIG. 18 will be described in detail in relation to the adjustment flow shown in FIG. 5.

First, in the first field of the first frame, a data signal Vid of the positive polarity, that is synchronized with the timing and the polarity of the alternating signal FR, is output (Step S1).

A detection current is measured as a detection current Ia11 of the period in which the data signal Vid of the positive-polarity is applied (Step S2).

Then, the detection current Ia11 is accumulated so as to be recorded as an accumulation current Ib11 (Step S3). Subsequently, also in the second field, similar to the first field, a data signal Vid of the negative polarity, that is synchronized with the timing and the polarity of the alternating signal FR, is output (Step S4). A detection current value is measured as a detection current Ia12 of the period in which the data signal Vid of the negative-polarity is applied (Step S5).

Then, the detection current Ia12 is accumulated so as to be recorded as an accumulation current Ib12 (Step S6).

In the form shown in FIG. 18, the accumulation current Ib11 accumulated during the first field in which the positive-polarity voltage is applied and the accumulation current Ib12 accumulated during the second field in which the negative-polarity voltage is applied are not the same as shown in the figure, and the accumulation current Ib11 is larger than the accumulation current Ib12 (Steps S7 and S8).

Accordingly, the electric potential of the opposing electrode electric potential Vcom is raised by one level, and then, the process proceeds to the first field of the second frame (Step S9).

Then, in the second frame, since the electric potential of the opposing electrode electric potential Vcom is raised by one level, the adjustment flow shown in FIG. 5 is performed, the same as in the first frame, in a state in which the opposing electrode electric potential Vcom is the electric potential v+1 as denoted by the dotted line.

As a result, an accumulation current Ib13 accumulated during the first field of the second frame and an accumulation current Ib14 accumulated during the second field are not the same as shown in FIG. 18, and the accumulation current Ib13 is larger than the accumulation current Ib14 (Steps S7 and S8).

Accordingly, after the electric potential of the opposing electrode electric potential Vcom is raised by one level, the process proceeds to the third frame (Step S9).

Next, in the third frame, the electric potential of the opposing electrode potential Vcom is raised by one level, and accordingly, the adjustment flow shown in FIG. 5 is performed, the same as in the first frame, in a state in which the opposing electrode electric potential Vcom is the electric potential v+2 as denoted by the dotted line.

As a result, an accumulation current Ib15 accumulated during the first field of the third frame and an accumulation current Ib16 accumulated during the second field are the same as shown in FIG. 18. Accordingly, the process proceeds to the next frame with the electric potential v+2 maintained (Step S7).

As described above, the adjustment flow shown in FIG. 5 can be applied also in the case of double-speed driving.

In addition, similarly, the adjustment flow shown in FIG. 7 may be applied to this embodiment.

Also in such a case, the word ‘frame’ in description of FIG. 7 and FIG. 6 are paraphrased with a word ‘field’. In particular, in the method shown in FIGS. 7 and 6, adjustment is performed with two consecutive frames of the positive polarity and the negative polarity used as one period. However, according to this embodiment, adjustment is performed with two fields of the positive polarity and the negative polarity, with one frame used as one period.

In other words, in the double-speed driving, the value of the accumulation current accumulated during one frame is controlled to be smaller than a predetermined current value.

In particular, in the first frame shown in FIG. 18, the sum current is the current value that is acquired from adding up the heights of the accumulation current Ib11 and the accumulation current Ib12. Similarly, in the second frame, the sum current is the current value that is acquired from adding up the heights of the accumulation current Ib13 and the accumulation current Ib14.

As described above, also in the case of the double-speed driving, the adjustment flow shown in FIG. 7 can be applied.

<<Second Adjustment Method>>

Figure 19:
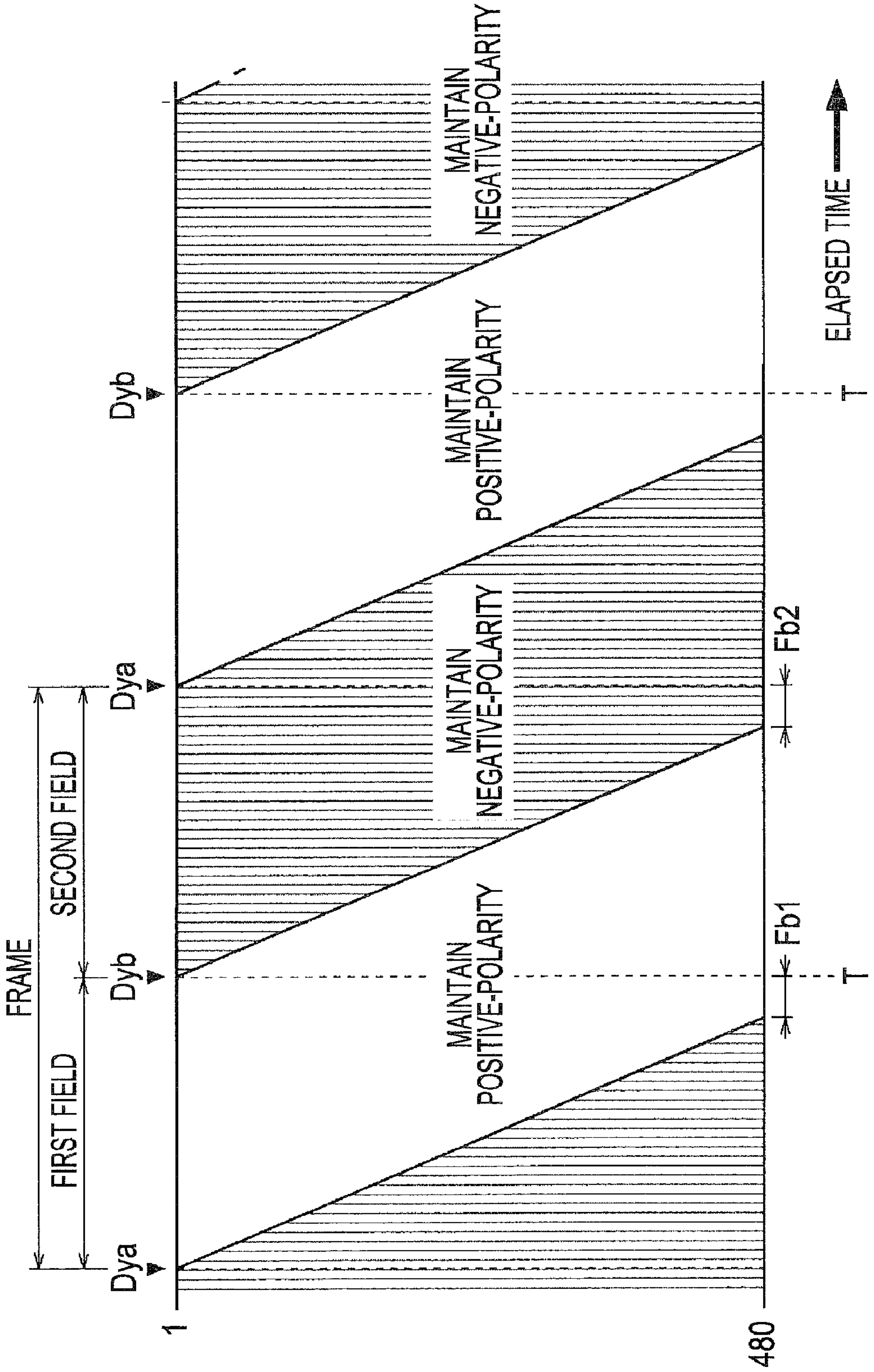
FIG. 19 is a diagram showing the writing states of each row in a reference phase of face-inversion double-speed driving together with the elapse of time over consecutive frames.

FIG. 19 is a diagram showing the writing states of each row in the double-speed driving together with the elapse of time over consecutive frames.

Here, the second adjustment method will be described.

According to the second adjustment method, the ratio of the length of the positive-polarity period to the length of the negative-polarity period in one frame is changed by adjusting the start timing of the second field, and whereby the effective value of the voltage for the positive polarity and the negative polarity is adjusted.

FIG. 19 is a diagram showing the writing states of each row together with the elapse of time over consecutive frames in accordance with the timing chart shown in FIG. 17. In FIG. 19 the scanning lines 1 to 480 are represented on the vertical axis, and the horizontal axis represents the elapse of time.

First, in the scanning line 1, the writing of the positive polarity is performed in the first field of the first frame with the start pulse Dya used as a trigger. Then, the writing of the negative polarity is performed in the second field with the start pulse Dyb output at the timing T used as a trigger. Here, the holding periods of the positive polarity and the negative polarity are the same as the lengths of the first field and the second field that are shifted at the timing T of a center point of one frame.

Similarly, for the scanning lines 2 to 480, the writing timings are shifted in a time series. However, the holding periods of the positive-polarity voltage and the negative-polarity voltage are the same.

In other words, as shown in FIG. 19, for a case where the start pulse Dyb is output at the timing T, both the period lengths of the first field and the second field are 240 periods of the clock signal Cly, and the holding periods of the positive polarity and the negative polarity are the same. However, the effective values of the positive polarity and the negative polarity cannot be the same due to the difference of characteristics of the above-described substrates and the like.

Figure 20:
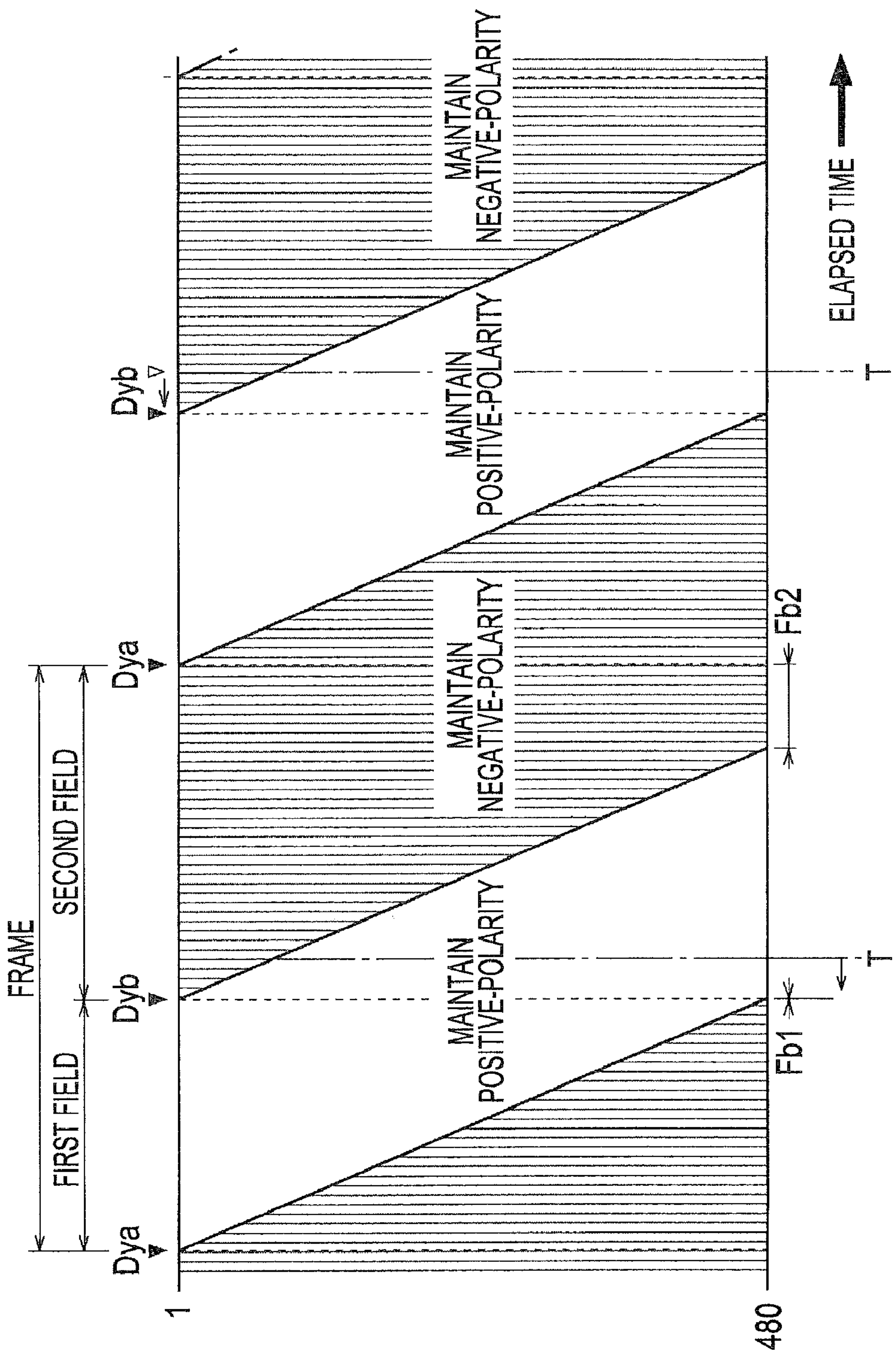
FIG. 20 is a diagram showing the writing states of each row together with the elapse of time over consecutive frames for a case where a phase is advanced.
Figure 21:
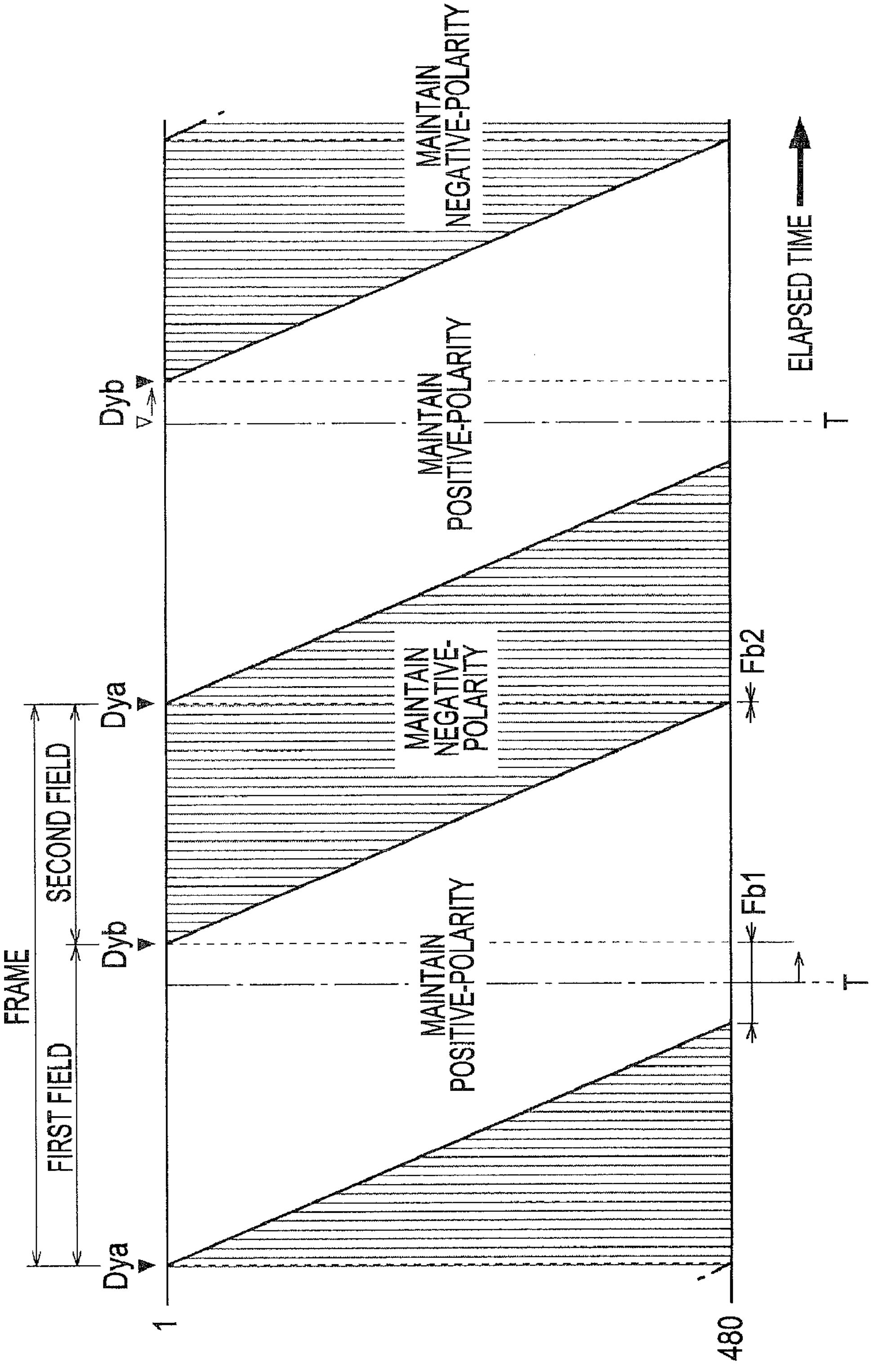
FIG. 21 is a diagram showing the writing states of each row together with the elapse of time over consecutive frames for a case where the phase is delayed.

FIG. 20 is a diagram showing the writing states of each row together with the elapse of time over consecutive frames for the case where the start timing of the second field is advanced. In addition, FIG. 21 is a diagram showing the writing states of each row together with the elapse of time over consecutive frames for case where the start timing of the second field is delayed.

Accordingly, in the second adjustment method, the effective values of voltages of the positive polarity and the negative polarity are adjusted by gradually shift the output timing of the start pulse Dyb forward or backward. In addition, the adjustment timing of the phase is performed in steps for adjusting the opposing electrode electric potential Vcom in each adjustment flow.

Here, as an example, the case of the adjustment flow shown in FIG. 5 will be described.

First, the process of Steps S1 to S8 is the same as that of the first adjustment method. In Step S9, the accumulation current accumulated during the positive-polarity displaying period is larger than the accumulation current accumulated during the negative-polarity image displaying period (Step S8). Accordingly, the output timing of the start pulse Dyb is advanced by one level, and the flow ends.

In FIG. 20, an appearance in which the start timing of the second field is advanced is shown. In the scanning line 1, the output timing of the start pulse Dyb is shifted forward by a specific time, and accordingly, the positive polarity holding period of the first field is shortened by the same amount. Accordingly, the negative-polarity holding period of the second field is lengthened by the same amount. In other words, the length of the first field within one frame is relatively shortened, and the length of the second field is relatively lengthened.

In other words, the ratio of the effective value of the voltage of the negative polarity within one frame can be increased by advancing the start timing of the second field. The effect is the same as that of raising the electric potential of the opposing electrode electric potential Vcom.

In addition, for the scanning lines 2 to 480, the writing timings are shifted in a time series. However, the length of the first field is relatively shortened, and the length of the second field is relatively lengthened.

In addition, the step for adjusting the start timing of the second field is appropriately set based on the clock signal of the clock generating circuit 54 (FIG. 1). When the start pulse Dyb is advanced relative to the timing T, the limit for the advancement, as shown in FIG. 20, is until a flyback time Fb1 becomes zero.

In Step S10, the accumulation current accumulated during the positive-polarity displaying period is smaller than the accumulation current accumulated during the negative-polarity image displaying period (Step S8). Accordingly, the output timing of the start pulse Dyb is delayed by one level, and the flow ends.

In FIG. 21, an appearance is shown in which the start timing of the second field is delayed by some amount. In the scanning line 1, the output timing of the start pulse Dyb is delayed, and accordingly, the positive polarity holding period of the first field is lengthened by the same amount. Accordingly, the negative-polarity holding period of the second field is shortened by the same amount. In other words, the length of the first field within one frame is relatively lengthened, and the length of the second field is relatively shortened.

In other words, the ratio of the effective value of the voltage of the positive polarity within one frame can be increased by delaying the start timing of the second field. The effect is the same as that of lowering the electric potential of the opposing electrode electric potential Vcom.

In addition, for the scanning lines 2 to 480, the writing timings are shifted in a time series. However, the length of the first field is relatively lengthened, and the length of the second field is relatively shortened. In addition, the step for adjusting the start timing of the second field is appropriately set based on the clock signal of the clock generating circuit 54 (FIG. 1). When the start pulse Dyb is delayed relative to the timing T, the limit for the delay, as shown in FIG. 21, is until a flyback time Fb2 becomes zero.

In addition, the electro-optical device 6 can be adjusted in accordance with the adjustment flow shown in FIG. 7. Also in such a case, in the step for adjusting the opposing electrode electric potential Vcom, the start timing of the second field is adjusted.

In particular, in Step S16, instead of lowering the electric potential of the opposing electrode electric potential Vcom, the output timing of the start pulse Dyb is delayed by one level. In addition, in Step S28, instead of raising the electric potential of the opposing electrode electric potential Vcom, the output timing of the start pulse Dyb is advanced by one level.

In addition, in the case of electro-optical device 6, the configuration shown in FIG. 8 and the adjustment flow shown in FIG. 9, the configuration and the adjustment method that are shown in FIG. 10, or the configuration shown in FIG. 12 and the adjustment flow shown in FIG. 15 can be applied.

Even in such a case, in each operation flow, the output timing of the start pulse Dyb is delayed by one level in the step for lowering the electric potential of the opposing electrode electric potential Vcom. In addition, the output timing of the start pulse Dyb is advanced by one level in the step for raising the electric potential of the opposing electrode electric potential Vcom.

As described above, according to this embodiment, the following advantages can be acquired in addition to the advantages of Embodiment 1.

According to the electro-optical device 6, for a case where the double-speed driving is employed, the opposing electrode potential Vcom is adjusted such that the accumulation current accumulated during the first field of the positive polarity and the accumulation current accumulated during the second field of the negative polarity are the same.

Alternatively, the opposing electrode electric potential Vcom is adjusted such that the sum current acquired from summing the accumulation current for the first field and the accumulation current for the second field is smaller than a predetermined current value.

Alternatively, the ratio of the period length of the first field to the period length of the second field in one frame is adjusted such that the accumulation current accumulated during the first field and the accumulation current accumulated during the second field are the same.

Accordingly, the detection of the current is performed in real time in parallel with the double-speed driving, and the result can be reflected on the opposing electrode electric potential Vcom or on the phases of the positive polarity and the negative polarity.

As a result, an electro-optical device capable of performing the double-speed driving and suppressing the occurrence of display problems such as burn-in can be provided.

Embodiment 8

Figure 22:
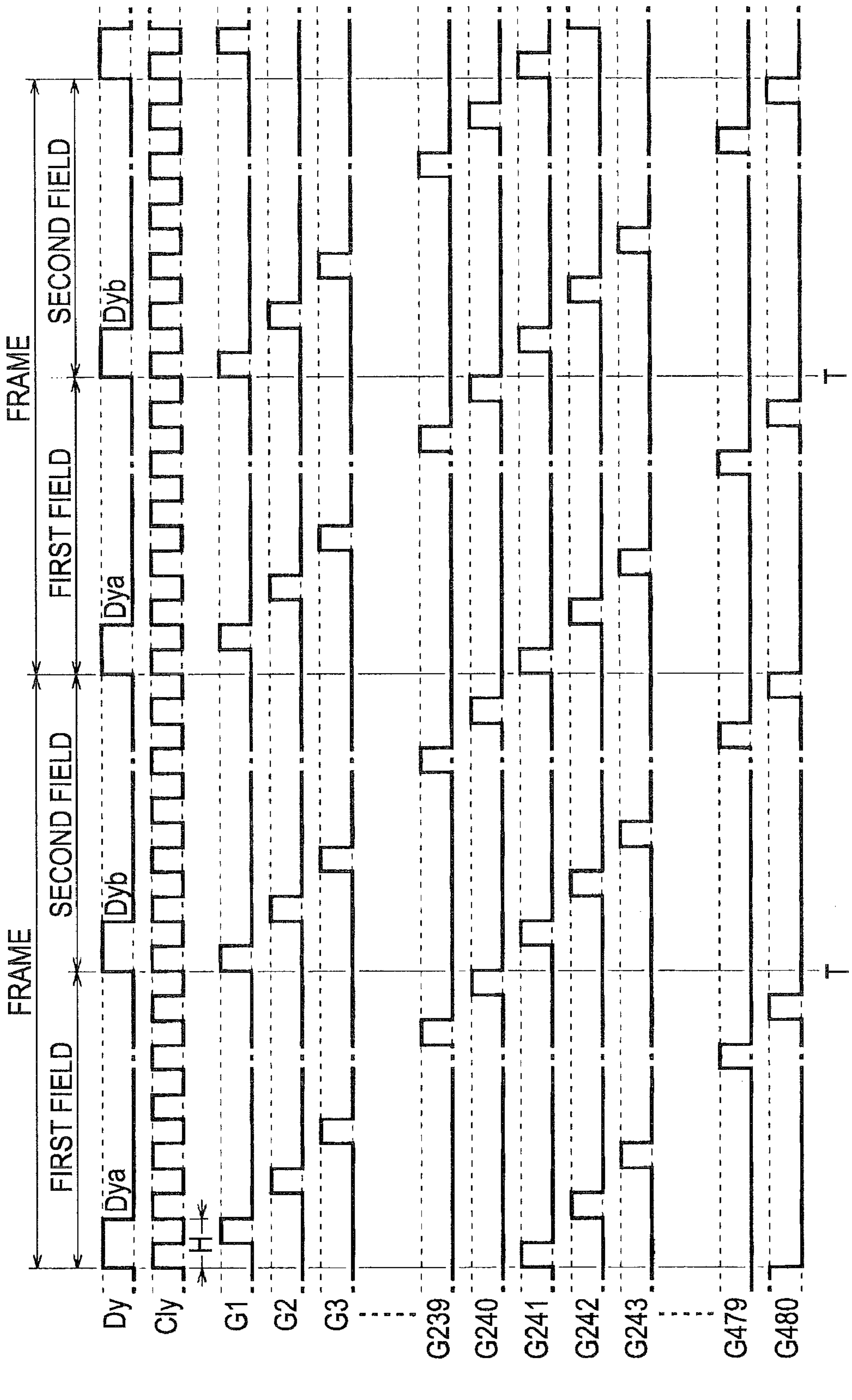
FIG. 22 is a timing chart of the driving method according to Embodiment 8 of the invention.

FIG. 22 is a timing chart of a driving method according to Embodiment 8 of the invention.

Here, the description of the sections that overlap with those in the description of Embodiments 1 and 7 are omitted. In addition, to each of the same configuration sections, the same reference numbers have been assigned.

First, the configuration of the electro-optical device according to Embodiment 8 is the same as that of the electro-optical device 6 shown in FIG. 16, and a frame memory used for double-speed driving is mounted on the electro-optical device. The other configurations are the same as those of the electro-optical device 1 according to Embodiment 1 as described with reference to FIGS. 1 to 3.

In Embodiment 8, the so-called area-scanning inverting driving, in which a plurality of scanning lines are divided into a first scanning line group and a second scanning line group, is configured so that one scanning line from among the first scanning line group and one from among the second scanning line group are alternately selected in one frame, and each scanning line is selected twice in one frame.

<<Method of Driving Display>>

As shown in FIG. 22, in the area-scanning inverting driving, in the first field of the first frame, the scanning lines are sequentially selected in the order of the 241th, 1st, 242nd, 2nd, 243rd, 3rd, . . . , 480th, and the 240th row. In particular, scanning signals G1 to G240 supplied to the scanning lines 1 to 240 are output when the clock signal Cly has the level L, and scanning signals G241 to G480 supplied to the scanning lines 241 to 480 are output when the clock signal Cly has level H.

Accordingly, after storing display data Video supplied from an external higher-level device in the frame memory 58, the control unit 50 controls a scanning line driving circuit 130 such that the scanning line of the 241th row is selected first. In addition, the control unit 50 allows a display data processing circuit 55 to read out display data Video corresponding to the 241th row that is stored in the frame memory 58 at double speed.

Figure 24:
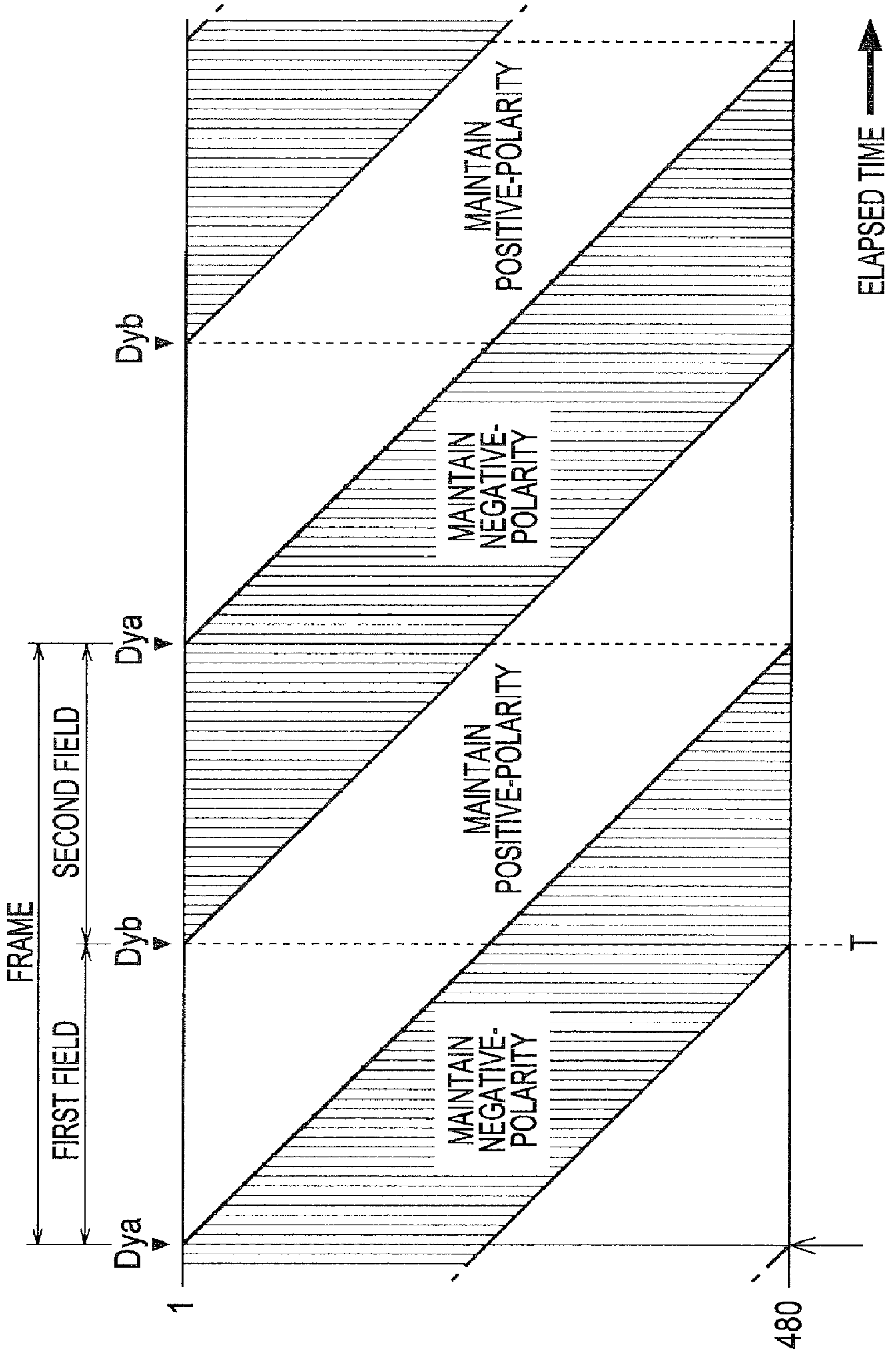
FIG. 24 is a diagram showing the writing states of each row in the reference phase of area-scanning inverted driving together with the elapse of time over consecutive frames.

FIG. 24 is a diagram showing the writing states of each row in the reference phase of the area-scanning inverted driving together with the elapse of time over consecutive frames.

In FIG. 24, the timing chart shown in FIG. 22 is represented as a graph. FIG. 24 shows an appearance in which, in the first field of the first frame, the writing of the positive polarity is performed for the scanning line 1 with the start pulse Dya used as a trigger, and the writing of the negative polarity is performed for the scanning line 241 with the start pulse Dya used as a trigger. In addition, thereafter, the writing of the positive polarity is sequentially performed for the scanning lines 2 to 240, and the writing of the negative polarity is sequentially performed for the scanning lines 242 to 480.

Here, the selection of the scanning line is sequentially performed in the order of the 241st row, the 1st row, the 242nd row, the 2nd row, . . . . However, the scanning lines 1 to 240 for writing the positive polarity may be regarded as a first scanning line, and the scanning lines 241 to 480 for writing the negative polarity may be regarded as a second scanning line.

In other words, within the first field, the scan driving is performed by using two scanning lines of the first scanning line for writing the positive polarity and the second scanning line for writing the negative-polarity.

In addition, in the second field of the first frame, the writing of the negative polarity is performed for the first scanning line, and the writing of the positive polarity is performed for the second scanning line, with the start pulse Dyb used as a trigger. In other words, in each scanning line, the writing of the polarity that is opposite to the polarity in the first field is performed.

In addition, in the reference phase shown in FIG. 24, the start pulse Dyb is output at the timing T that is the center of one frame.

<<First Adjustment Method>>

Figure 23:
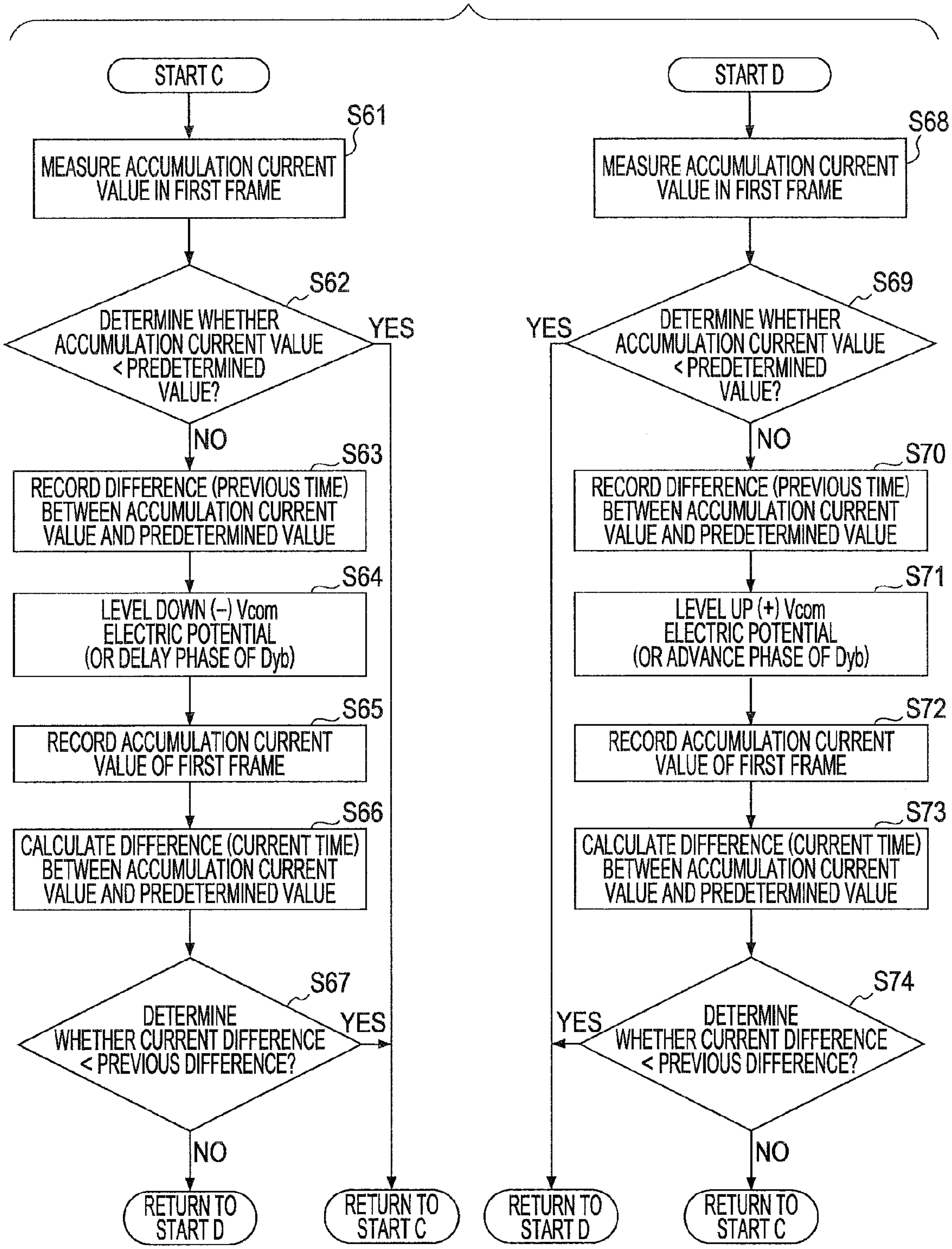
FIG. 23 is a flowchart showing the adjustment method according to Embodiment 8.

FIG. 23 is a flowchart showing the adjustment method according to Embodiment 8.

Also when the area-scanning inverted driving of Embodiment 8 is employed, a first adjustment method and a second adjustment method can be applied.

First, the first adjustment method will be described.

As described above, in the area-scanning inverted driving, the positive polarity and the negative polarity are written approximately parallel by two scanning lines within one field. Accordingly, it is difficult to divide a positive-polarity image displaying period and a negative-polarity image displaying period, and thus, the adjustment flow of FIG. 7 is applied. In other words, the opposing electric potential Vcom is adjusted such that the accumulation current accumulated during each frame is smaller than a predetermined current value.

The flowchart shown in FIG. 23 is configured by two flows; flow C that is started from start C and flow D that is started from start D. In addition, the frame numbers described below do not represent specific frames but represents frames that are part of a continuous time series. First, the operation process of flow C that is started from Step S61 will be described.

In Step S61, an image is displayed in the first frame. In addition, a current flowing through a wiring 108 is detected, and the accumulation current accumulated during an image displaying period is measured. In particular, currents are sequentially detected over the first field and the second field that configure on the first frame, and the absolute values thereof are accumulated. Here, a displayed image is an image in an ordinary display mode. In Step S62, it is determined whether the accumulation current acquired in Step S61 is smaller than a predetermined current value. When the accumulation current is smaller than the predetermined current value, the process returns to start C. On the other hand, when the accumulation current is equal to or larger than the predetermined current value, the process proceeds to Step S63.

In addition, the predetermined current value is a threshold value that is set in advance based on the design specifications, experimental data, or the like of the display panel 10. The predetermined current value is set to a value for which a display problem such as flicker can be suppressed in the case where the sum current is smaller than the predetermined current value.

In Step S63, a difference (previous difference) is calculated by subtracting the accumulation current acquired in Step S61 from the predetermined current value and this difference is stored.

In Step S64, the electric potential of the opposing electrode electric potential Vcom is lowered by one level.

In Step S65, an image is displayed in the second frame. In addition, a current flowing through the wiring 108 is detected, and an accumulation current accumulated during the image displaying period is measured.

In Step S66, a difference (recent difference) is calculated by subtracting the accumulation current acquired in Step S65 from the predetermined current value and this difference is stored.

In Step S67, it is determined whether the recent difference acquired in Step S66 is smaller than the previous difference recorded in Step S63. When the recent difference is smaller than the previous difference, the process returns to start C. On the other hand, when the recent difference is equal to or larger than the previous difference, the process proceeds to start D.

Here, it is determined whether the accumulation current has become closer to the predetermined current value by lowering the electric potential of the opposing electrode electric potential Vcom by one level in Step S64. When the recent difference is smaller than the previous difference, the accumulation current is determined to have become closer to the predetermined current value. Accordingly, the adjustment (correction) direction is determined to be correct, and thus, flow C is performed again.

Subsequently, flow D will be described.

In Step S68, an image is displayed in the third frame. In addition, a current flowing through the wiring 108 is detected, and the accumulation current accumulated during the image displaying period is measured.

In Step S69, it is determined whether the accumulation current acquired in Step S68 is smaller than a predetermined current value. When the accumulation current is smaller than the predetermined current value, the process returns to start D. On the other hand, when the accumulation current is equal to or larger than the predetermined current valuer the process proceeds to Step S70.

In Step S70, a difference (previous difference) is calculated by subtracting the accumulation current acquired in Step S68 from the predetermined current value and this difference is stored.

In Step S71, the electric potential of the opposing electrode electric potential Vcom is raised by one level.

In Step S72, an image is displayed in the fourth frame. In addition, a current flowing through the wiring 108 is detected, and the accumulation current accumulated during the image displaying period is measured.

In Step S73, a difference (recent difference) is calculated by subtracting the accumulation current acquired in Step S72 from the predetermined current value and this difference is stored.

In Step S74, it is determined whether the recent difference acquired in Step S73 is smaller than the previous difference recorded in Step S70. When the recent difference is smaller than the previous difference, the process returns to start D. On the other hand, when the recent difference is equal to or larger than the previous difference, the process proceeds to start C.

In flow D, the adjustment for raising the electric potential of the opposing electrode electric potential Vcom by one level is performed in Step S71. In other words, flow D is a flow for performing an adjustment in a direction opposite to that of flow C. By combining flow C and flow D, adjustments (corrections) in both directions, for the raising and lowering the electric potential of the opposing electrode electric potential Vcom, are realized.

<<Second Adjustment Method>>

Here, the second adjustment method will be described.

According to the second adjustment method, an effective value of the voltage is adjusted by adjusting the start timing of the second field.

First, the case of the reference phase shown in FIG. 21 will be described.

In the scanning line of the first row, the writing of the positive polarity is performed in the first field of the first frame by the first scanning line that is triggered in accordance with a start pulse Dya. Then, the writing of the negative polarity is performed in the second field by the second scanning line that is triggered in accordance with a start pulse Dyb output at the timing T.

In addition, in the scanning line of the 241st row, the writing of the negative polarity is performed in the first field of the first frame by the second scanning line that is triggered in accordance with the start pulse Dya. Then, the writing of the positive polarity is performed in the second field by the first scanning line that is triggered in accordance with the start pulse Dyb.

In other words, since the first field and the second field are shifted at the timing T that represents the center of the first frame, the holding periods of the positive-polarity voltage and the negative-polarity voltage are the same regardless of the writing order of the positive polarity and the negative polarity.

Figure 25:
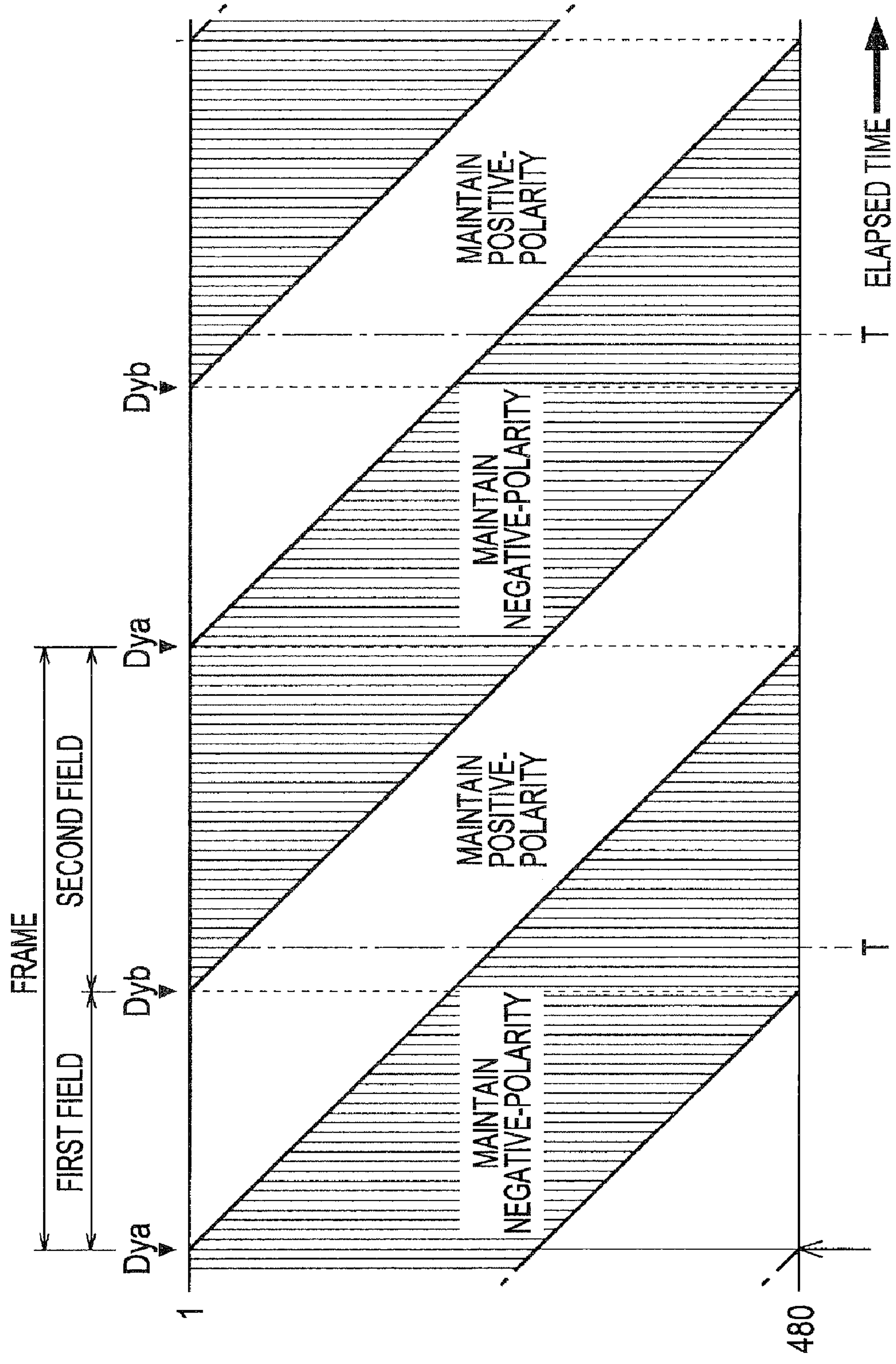
FIG. 25 is a diagram showing the writing states of each row together with the elapse of time over consecutive frames for a case where the phase is advanced.
Figure 26:
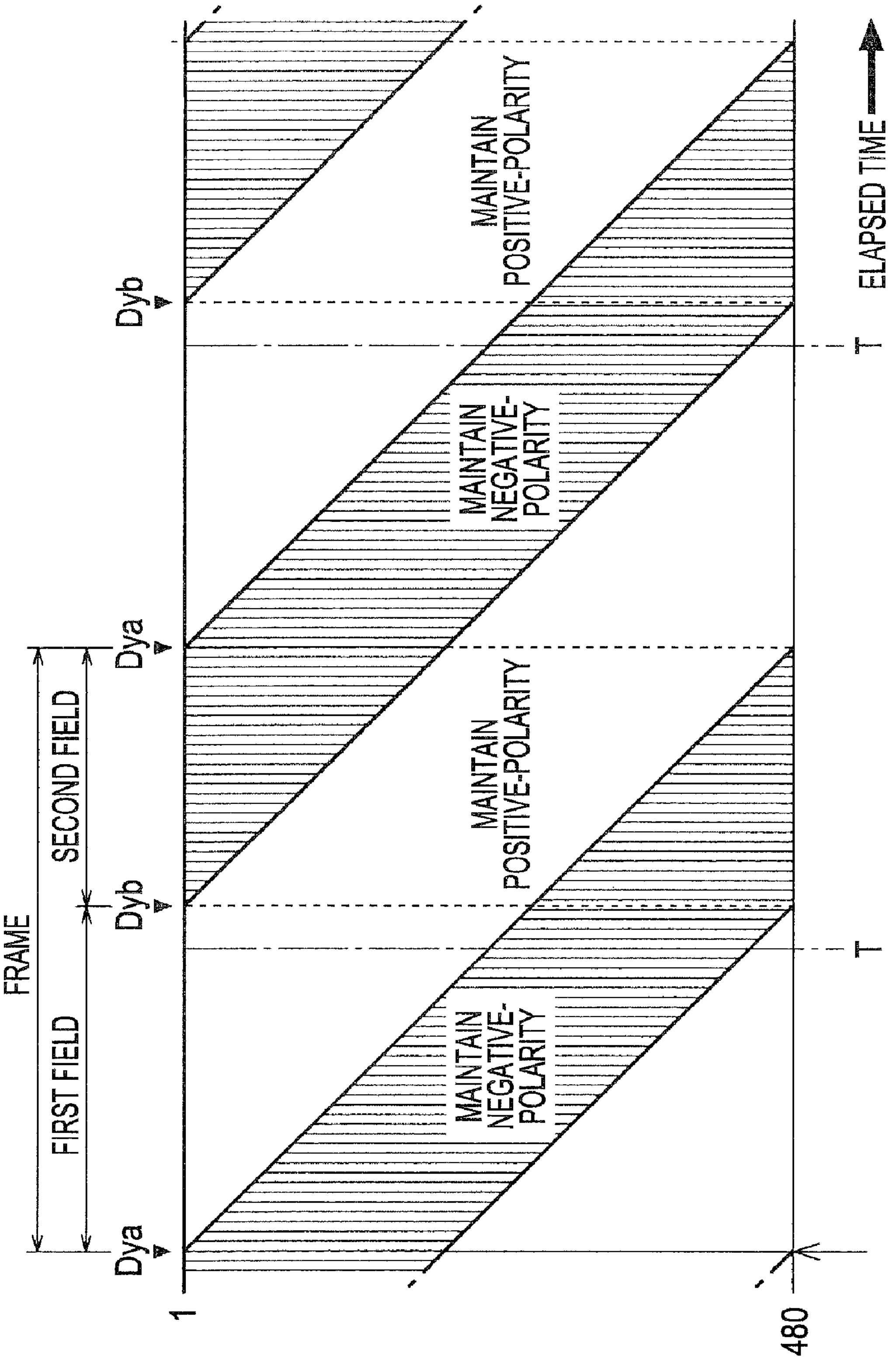
FIG. 26 is a diagram showing the writing states of each row together with the elapse of time over consecutive frames for a case where the phase is delayed.

FIG. 25 is a diagram showing the writing states of each row together with the elapse of time over consecutive frames for the case where the phase is advanced. In addition, FIG. 26 is a diagram showing the writing states of each row together with the elapse of time over consecutive frames for the case where the phase is delayed.

In the second adjustment method, the effective values of voltages of the positive polarity and the negative polarity are adjusted by gradually shifting the output timing of the start pulse Dyb forward or backword.

In addition, the adjustment timing of the phase is performed in steps for adjusting the opposing electrode electric potential Vcom in the adjustment flow shown in FIG. 23.

In FIG. 23, steps other than Steps S64 and S71 are the same as those according to the first adjustment method.

In Step S64, instead of lowering the electric potential of the opposing electrode electric potential Vcom, the output timing of the start pulse Dyb is delayed by one level, and then, the flow ends.

In FIG. 26, an appearance is shown in which the phase is delayed. In the scanning line of the first row, as the output timing of the start pulse Dyb is delayed by some amount, the positive polarity holding period is lengthened in the first field by the same amount. In addition, the negative polarity holding period is shortened in the second field by the same amount. In other words, the length of the first field is relatively lengthened within one frame, and the length of the second field is relatively shortened.

In addition, for the scanning lines 2 to 480, the writing timings are shifted in a time series. However, the length of the first field is relatively lengthened, and the length of the second field is relatively shortened. In addition, in the step for adjusting the phase, for example, one period of the clock signal Cly is set as one step.

In other words, the ratio of the effective value of the positive-polarity voltage within one frame can be increased by delaying the phase. The effect is the same as that of lowering the electric potential of the opposing electrode electric potential Vcom.

In FIG. 25, an appearance is shown in which the phase is advanced. In the scanning line of the first row, as the output timing of the start pulse Dyb is advanced by some amount, the positive polarity holding period is shortened in the first field by the same amount. In addition, the negative polarity holding period is lengthened in the second field the same amount. In other words, the length of the first field is relatively shortened within the first frame, and the length of the second field is relatively lengthened. In addition, for the scanning lines 2 to 480, the writing timings are shifted in a time series. However, the length of the first field is relatively shortened, and the length of the second field is relatively lengthened.

In other words, the ratio of the effective value of the negative-polarity voltage within one frame can be increased by advancing the phase. The effect is the same as that of raising the electric potential of the opposing electrode electric potential Vcom.

In addition, the configuration shown in FIG. 8, the configuration shown in FIG. 10, or the configuration shown in FIG. 12 can be applied to the electro-optical device 6. In such a case, the adjustment flow shown in FIG. 23 is applied to the adjustment method, and a test image may be used in a configuration in which the test mode is used.

As described above, according to this embodiment, the following advantages can be acquired in addition to the advantages of Embodiments 1 and 7.

In a case where the area-scanning inverted driving is employed, the ratio of the length of the first field to the length of the second field in one frame is adjusted such that the sum current acquired from summing the accumulation current accumulated during the first field of the positive polarity and the accumulation current accumulated during the second field of the negative polarity is smaller than the predetermined current value.

In other words, a current detecting operation is performed in real time in parallel with the area-scanning inverted driving, and the result thereof can be reflected on the phases of the positive-polarity and the negative-polarity.

As a result, an electro-optical device capable of performing the area-scanning inverted driving and suppressing the occurrence of display problems such as burn-in can be provided.

(Electronic Apparatus)

FIG. 27 is a plan view showing the configuration of a three-plate type projector that uses the display panel 10, in each of the above-described electro-optical devices 1 to 6, as a light valve.

Next, an example of an electronic apparatus that uses an electro-optical device according to the above-described embodiment will be described. In the projector 2100, light to be incident to a light valve is divided into the light of the three primary colors of R (red color), G (green color), and B (blue color) by three mirrors 2106 and two dichroic mirrors 2108 that are disposed inside, and is guided to light valves 10R, 10G, and 10B corresponding to the primary colors. In addition, the light of the B color, compared to light of other colors including the R color and the G color, has a long light path. Thus, in order to prevent the loss, the light of the B color is guided through a relay lens system 2121 that is formed by an incident lens 2122, a relay lens 2123, and an output lens 2124.

The configuration of the light valves 10R, 10G, and 10B is the same as that of the display panel 10 according to each of the above-described embodiments. The light valves 10R, 10G, and 10B are driven in accordance with image data, which is supplied from an external higher-level device (not shown), corresponding to the colors of R, G, and B.

The light modulated by the light valves 10R, 10G, 10B is incident to a dichroic prism 2112 from three directions. Then, in this dichroic prism 2112, the light of the R color and the light of the B color are refracted by 90 degrees, and the light of the G color advances straight onwards. The light representing a color image that is composed by the dichroic prism 2112 is projected on an enlarged scale by a lens unit 2114, and whereby a full color image is displayed on a screen 2120.

In addition, after being reflected by the dichroic prism 2112, transmitted images of the light valves 10R and 10B are projected. On the other hand, a transmitted image of the light valve 10G is directly projected. Accordingly, it is set that the images formed by the light valves 10R and 10B and an image formed by the light valve 10G have a horizontally inverted relationship.

In addition, as electronic apparatuses, there are a rear-projection type television set and a direct-view type such as a cellular phone, a personal computer, a monitor of a video camera, a car navigation system, a pager, an electronic organizer, a calculator, a word processor, a workstation, a television telephone, a POS terminal, a digital still camera, and an apparatus having a touch panel, in addition to the electronic apparatus described with reference to FIG. 27. The electro-optical device according to an embodiment of the invention can be applied to these electronic apparatuses.

The invention is not limited to the above-described embodiments, and various changes or modifications can be made therein. Hereinafter, modified examples will be described.

MODIFIED EXAMPLE 1

Description will be followed with reference to FIG. 1.

In the above-described embodiments, the resistor Rs, which is used as the current detecting element, is inserted into the wiring 108 that connects the Com voltage generating circuit 57 to the opposing electrode Com. However, the invention is not limited to a configuration in which the resistor Rs is externally attached. As the resistor, an element that can detect a current flowing through the liquid crystal capacitor may be used. For example, a resistance component of the TFT 116 (FIG. 3) that is originally assembled into the driving circuit of the display panel 10 may be used.

Under such a configuration, the current can be detected without influencing the original circuit constants.

MODIFIED EXAMPLE 2

Description will be followed with reference to FIGS. 5 and 7.

In the above-described embodiments, adjustments that are based on the adjustment flow shown in FIG. 5 or the adjustment flow shown in FIG. 7 are described to be performed independently. However, the above-described two adjustment flows may be performed continuously.

In such a case, it is preferable that the adjustment flow shown in FIG. 7 is performed after the adjustment flow shown in FIG. 5 is performed. According to this composite adjustment flow, after the accumulation current accumulated during the positive-polarity image displaying period and the accumulation current accumulated during the negative-polarity image displaying period become the same according to the adjustment flow shown in FIG. 5, the sum current for the total image displaying periods of the positive polarity and the negative polarity is adjusted to be smaller than a predetermined current value according to the adjustment flow shown in FIG. 7.

Accordingly, after the accumulation currents of the positive polarity and the negative polarity are balanced, the sum current for the total period of the positive polarity and the negative polarity is adjusted to be decreased. As a result, power consumption can be reduced.

MODIFIED EXAMPLE 3

In the above-described embodiments, the so-called dot-sequential configuration is used in which voltages corresponding to gray scales are sequentially written into pixels of one row from the 1st column to the 640th column for the pixels according to a scanning line 112 of the row by sequentially sampling data signals Vid of the 1st column to the 640th column. However, the so-called phase expansion (also referred to as serial-to-parallel conversion) driving, in which a data signal is expanded by n (here, n is an integer that is equal to or larger than 2) times in the time axis and is supplied to n image signal lines, may be used together (see JP-A-2000-112437).

Alternatively, the so-called line sequential configuration in which data signals are supplied together to all the data lines 114 may be used.

Even when the above-described driving methods are used, advantages that are the same as those of the above-described embodiments can be acquired. In addition, in each of the above-described embodiments, a form to which a normally-white mode, in which white is displayed in a state of there being no application of a voltage, as a liquid crystal mode is applied, has been described. However, the invention may be applied to a normally-black mode in which black is displayed in a state of there being no application of a voltage.

What is claimed is:

1. An electro-optical device comprising:

a display panel having a switching transistor and a pixel electrode that are disposed in correspondence with an intersection of a scanning line and a data line, an opposing electrode that faces the pixel electrode, and an electro-optical layer that is disposed between the pixel electrode and the opposing electrode;

a detection unit that detects a current flowing through the electro-optical layer; and a control unit that controls the display driving of the display panel, wherein, when a voltage of an electric potential higher than an opposing electrode electric potential applied to the opposing electrode is defined to have a positive polarity and a voltage of an electric potential lower than the opposing electrode electric potential is defined to have a negative polarity, a data signal of the positive polarity and a data signal of the negative polarity are alternately supplied to the pixel electrode through the data line, and the control unit measures, based on a detection data supplied by the detection unit, a first accumulation current accumulated during a period in which a voltage of the positive polarity is applied and a second accumulation current accumulated during a period in which a voltage of the negative polarity is applied, and adjusts the opposing electrode electric potential such that a difference between the absolute value of the first accumulation current and the absolute value of the second accumulation current is decreased.

2. An electro-optical device comprising:

a display panel having a switching transistor and a pixel electrode that are disposed in correspondence with an intersection of a scanning line and a data line, an opposing electrode that faces the pixel electrode, and an electro-optical layer that is disposed between the pixel electrode and the opposing electrode;

a detection unit that detects a current flowing through the electro-optical layer; and a control unit that controls the display driving of the display panel, wherein, when a voltage of an electric potential higher than an opposing electrode electric potential applied to the opposing electrode is defined to have a positive polarity and a voltage of an electric potential lower than the opposing electrode electric potential is defined to have a negative polarity, a data signal of the positive polarity and a data signal of the negative polarity are alternately supplied to the pixel electrode through the data line, and the control unit measures, based on a detection data supplied by the detection unit, a first accumulation current accumulated during a period in which a voltage of the positive polarity is applied and a second accumulation current accumulated during a period in which a voltage of the negative polarity is applied, and adjusts the opposing electrode electric potential such that a sum current acquired from adding the absolute value of the first accumulation current and the absolute value of the second accumulation current is smaller than a predetermined current value.

3. An electro-optical device comprising:

a display panel having a switching transistor and a pixel electrode that are disposed in correspondence with an intersection of a scanning line and a data line, an opposing electrode that faces the pixel electrode, and an electro-optical layer that is disposed between the pixel electrode and the opposing electrode;

a detection unit that detects a current flowing through the electro-optical layer; and a control unit that controls the display driving of the display panel, wherein, when a voltage of an electric potential higher than an opposing electrode electric potential applied to the opposing electrode is defined to have a positive polarity and a voltage of an electric potential lower than the opposing electrode electric potential is defined to have a negative polarity, a data signal of the positive polarity and a data signal of the negative polarity are alternately supplied to the pixel electrode through the data line, and the control unit measures, based on a detection data supplied by the detection unit, a first accumulation current accumulated during a period in which a voltage of the positive polarity is applied and a second accumulation current accumulated during a period in which a voltage of the negative polarity is applied, and adjusts a ratio of a period length of a period where the voltage of the positive polarity is applied to a period length of a period where the voltage of the negative polarity in one cycle of the data signal such that a difference between the absolute value of the first accumulation current and the absolute value of the second accumulation current is decreased.

4. The electro-optical device according to claim 1, wherein the detection unit has a resistor, as a current detecting element, that is inserted into a first wiring used for supplying the opposing electrode electric potential from the control unit to the opposing electrode and wherein the detection unit detects the current flowing in the electro-optical layer through the opposing electrode based on an electric potential difference that is generated between both ends of the resistor.

5. The electro-optical device according to claim 4, further comprising:

a second wiring that is used for supplying the opposing electrode electric potential, that does not pass through the detection unit, to the opposing electrode from the control unit; and a shift switch that is used for shifting between the first wiring and the second wiring, wherein the control unit selects the first wiring by using the shift switch when the opposing electrode electric potential is being adjusted and selects the second wiring by using the shift switch when ordinary display is being performed.

6. The electro-optical device according to claim 1, wherein the opposing electrode is configured by a first opposing electrode that is disposed in an area which overlaps with the display area of the display panel in the plan view and a second opposing electrode that is disposed in an area located in the outside of the display area and is electrically independent from the first opposing electrode, wherein the opposing electrode electric potential is supplied to the first opposing electrode and to the second opposing electrode from the control unit, and wherein the detection unit detects the current flowing in the electro-optical layer through the second opposing electrode.

7. The electro-optical device according to claim 1, wherein the detection unit has a magnetic sensor as a current detecting element that is disposed along a wiring used for supplying the opposing electrode electric potential to the opposing electrode, and wherein the detection unit detects the current based on an output of the magnetic sensor.

8. The electro-optical device according to claim 1, wherein the detection unit has an optical sensor that is used for detecting the display luminance of the display panel, wherein the control unit measures a first response time that is required to obtain a predetermined luminance of the display luminance by sequentially detecting the display luminance using the optical sensor during a period in which a voltage of the positive polarity is applied, wherein the control unit measures a second response time that is required to obtain a predetermined luminance of the display luminance by sequentially detecting the display luminance using the optical sensor during a period in which a voltage of the negative polarity is applied, and wherein the control unit adjusts the opposing electrode electric potential such that a difference between the first response time and the second response time is decreased based on the correlation between the first response time and the first accumulation current and the correlation between the second response time and the second accumulation current.

9. An electronic apparatus comprising the electro-optical device according to claim 1 as a display unit.

* * * * *